US012533918B2

(12) United States Patent
Kasrawi et al.

(10) Patent No.: US 12,533,918 B2
(45) Date of Patent: Jan. 27, 2026

(54) AIR MOUNT WITH LATERAL CONTROL

(71) Applicant: Vibracoustic USA, Inc., South Haven, MI (US)

(72) Inventors: Bashar Nofal Kasrawi, Portland, OR (US); Shawn Michael Freyhof, Hamilton, MI (US); Daniel Johan Kaldner, Portland, OR (US); Philipp Werner, Lüneburg (DE)

(73) Assignee: Vibracoustic USA, Inc., South Haven, MI (US)

( * ) Notice: Subject to any disclaimer, the term of this patent is extended or adjusted under 35 U.S.C. 154(b) by 675 days.

(21) Appl. No.: 17/945,461

(22) Filed: Sep. 15, 2022

(65) Prior Publication Data

US 2024/0092132 A1 Mar. 21, 2024

(51) Int. Cl.
*B60G 11/28* (2006.01)
*B60G 17/052* (2006.01)

(52) U.S. Cl.
CPC .......... *B60G 11/28* (2013.01); *B60G 17/0521* (2013.01); *B60G 2202/152* (2013.01); *B60G 2204/126* (2013.01); *B60G 2206/424* (2013.01); *B60G 2206/73* (2013.01)

(58) Field of Classification Search
CPC ................ B60G 11/28; B60G 17/0521; B60G 2202/152; B60G 2204/126; B60G 2206/424; B60G 2206/73; B60G 2204/44; B60G 2204/4502
See application file for complete search history.

(56) References Cited

U.S. PATENT DOCUMENTS

| | | | | |
|---|---|---|---|---|
| 9,738,131 | B2* | 8/2017 | Keeler | F16F 9/049 |
| 2012/0061887 | A1* | 3/2012 | Westnedge | F16F 9/05 |
| | | | | 267/64.24 |
| 2014/0167337 | A1* | 6/2014 | Ramsey | F16F 9/057 |
| | | | | 267/124 |
| 2017/0240020 | A1* | 8/2017 | Delorenzis | B60G 17/0521 |
| 2019/0366789 | A1* | 12/2019 | Naples | B60G 17/0525 |
| 2020/0039309 | A1* | 2/2020 | Pielock | B60G 11/27 |

OTHER PUBLICATIONS

WO document No. WO 2012/097354 to Koeske published on Jul. 19, 2012.*
European Patent No. EP 3383681 to Delorenzis published on Jan. 6, 2021.*

* cited by examiner

*Primary Examiner* — Pamela Rodriguez
(74) *Attorney, Agent, or Firm* — Fishman Stewart PLLC

(57) ABSTRACT

An air spring may include a first member, a second member, a flexible bellows, and/or an isolator/bumper. The first member may include a first member axial extension that may extend in an axial direction. The second member may include a second member axial extension that may extend in the axial direction. The flexible bellows may be connected to the first member and the second member. The flexible bellows may define a pressurized fluid volume. The isolator/bumper may include an inner radial portion and an outer radial portion. The inner radial portion may be disposed radially inward of the first member axial extension or the second member axial extension. The outer radial portion may be disposed radially outward of the first member axial extension or the second member axial extension.

19 Claims, 19 Drawing Sheets

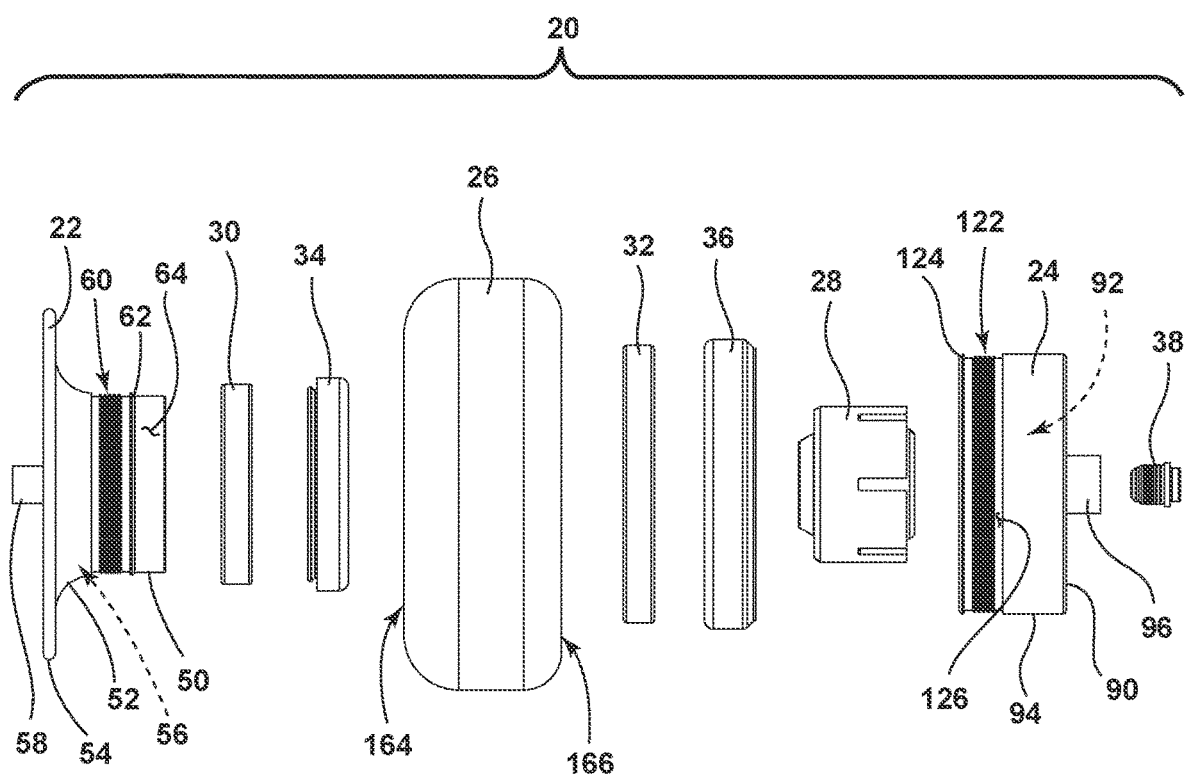
FIG. 1
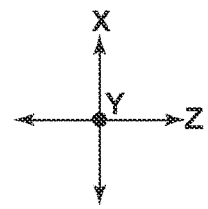

AIR MOUNT WITH LATERAL CONTROL

TECHNICAL FIELD

The present disclosure generally relates to air springs, including air springs that may, for example, be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some air spring designs may be heavy, large, complicated, difficult to assemble, and/or inefficient.

There is a desire for solutions/options that minimize or eliminate one or more challenges or shortcomings of air springs. The foregoing discussion is intended only to illustrate examples of the present field and is not a disavowal of scope.

SUMMARY

In embodiments, an air spring may include a first member, a second member, a flexible bellows, and/or an isolator/bumper. The first member may include a first member axial extension that may extend in an axial direction. The second member may include a second member axial extension that may extend in the axial direction. The flexible bellows may be connected to the first member and the second member. The flexible bellows may define a pressurized fluid volume. The isolator/bumper may include an inner radial portion and an outer radial portion. The inner radial portion may be disposed radially inward of the first member axial extension or the second member axial extension. The outer radial portion may be disposed radially outward of the first member axial extension or the second member axial extension.

With embodiments, a method of making an air spring may include providing a first member with a first member axial extension, a second member with a second member axial extension, a flexible bellows, and an isolator/bumper including an inner radial portion and an outer radial portion, disposing the inner radial portion radially inward of the second member axial extension, wherein a portion of the outer radial portion is disposed between the first member axial extension and the second member axial extension, connecting a portion of the second member and the flexible bellows, and/or connecting a portion of the first member and the flexible bellows.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

FIG. 1 is an exploded side view generally illustrating portions of an embodiment of an air spring according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 2:
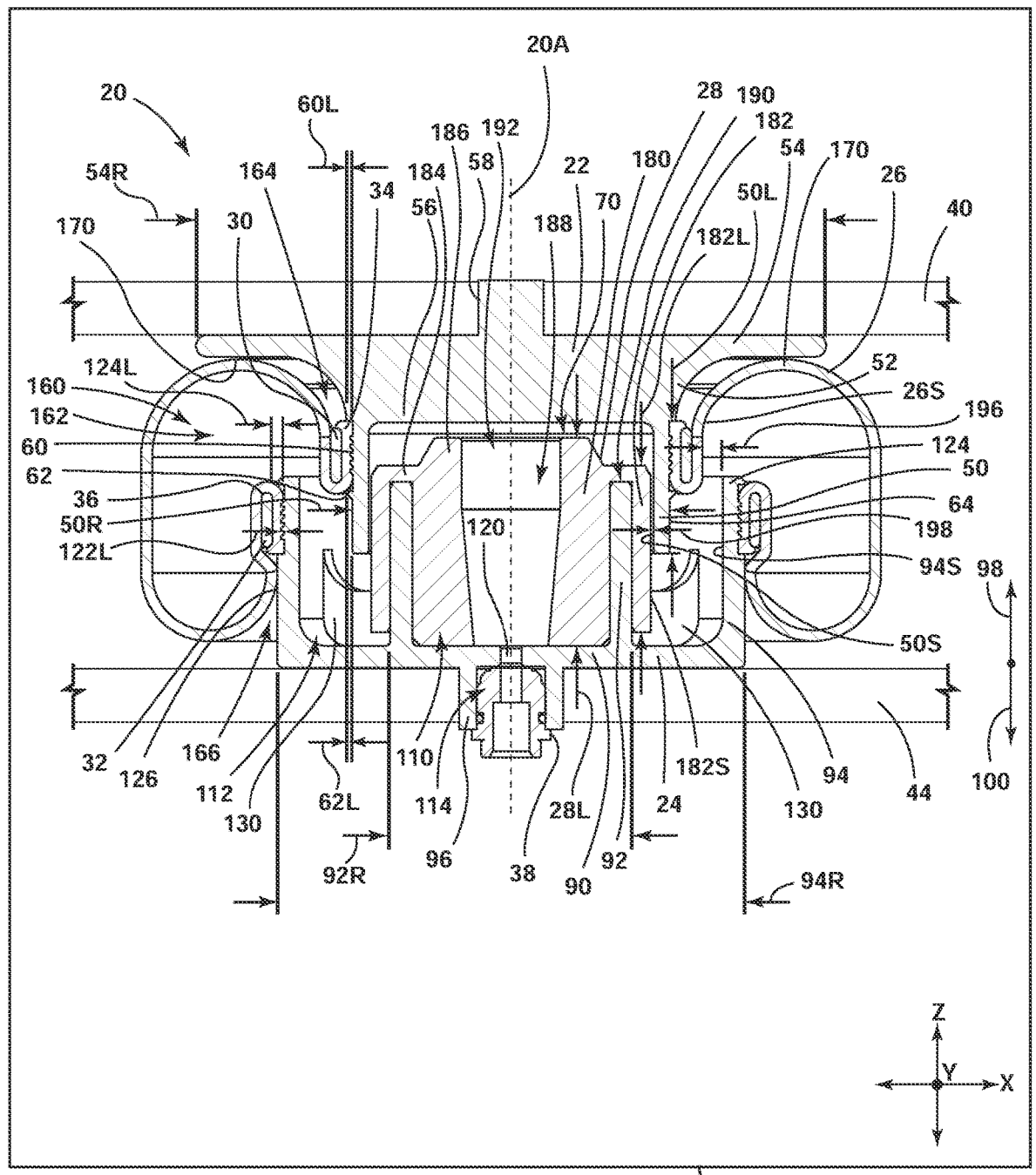
FIG. 2 is a cross-sectional view generally illustrating portions of an embodiment of an air spring according to teachings of the present disclosure.

In embodiments, such as generally illustrated in FIGS. 1 and 2, an air spring 20 may include a first member 22, a second member 24, a flexible bellows 26, an isolator/bumper 28, a first clamp 30, a second clamp 32, a first seal 34, a second seal 36, and/or a fluid connector 38. The first member 22 may be configured to facilitate connection of the air spring 20 with a first external component or structure 40 of vehicle 42 (e.g., a vehicle body, a vehicle frame, and/or a vehicle component, among others) and the second member 24 may be configured to facilitate connection of the air spring 20 with a second external component or structure 44 of the vehicle 42 (e.g., a vehicle body, a vehicle frame, and/or a vehicle component, among others). The air spring 20 may be configured to restrict, dampen, and/or absorb relative movement between the first external component 40 and the second external component 44. The air spring 20 may include an axis 20A (e.g., a central axis) that may extend in the Z-direction (see, e.g., FIG. 2).

With embodiments, a first member 22 may comprise one or more of a variety of shapes, sizes, configurations, and/or materials. The first member 22 may include an axial extension 50, a curved portion 52, an outer radial extension 54, a base 56, and/or a projection 58. The axial extension 50 may extend in an axial direction (e.g., Z-direction). In some instances, the axial extension 50 may extend from the base 56. In embodiments, such as generally illustrated in FIG. 1, the axial extension 50 may have a generally cylindrical configuration.

In embodiments, such as generally illustrated in FIGS. 1 and 2, the first member 22 may include a plurality of ring-shaped projections 60 and/or an additional projection 62. The ring-shaped projections 60 and/or the additional projection 62 may be configured to facilitate the connection of the first member 22 with one or more components of the air spring 20 (e.g., first clamp 30, first seal 34, and/or bellows 26). The ring-shaped projections 60 and/or the additional projection 62 may extend from an outer surface 64 of the axial extension 50, for example and without limitation, in a radial direction (e.g., X-direction). The additional projection 62 may be spaced apart from the ring-shaped projections 60. In some examples, the additional projection 62 may include a length 62L that is greater than a length 60L of a ring-shaped projection 60.

With embodiments, such as generally illustrated in FIG. 2, the axial extension 50 may include and/or define a cavity 70. The cavity 70 may be configured to receive at least portions of the second member 24 and/or the isolator/bumper 28. In some example configurations, the base 56 may be at least partly accessible via the cavity 70.

In embodiments, the curved portion 52 may be connected to the axial extension 50 and/or the radial extension 54. The radial extension 54 may extend in the radial direction (e.g., X-direction). The radial extension 54 may include a radius 54R that is greater than a radius of 50R of the axial extension 50.

Figure 4:
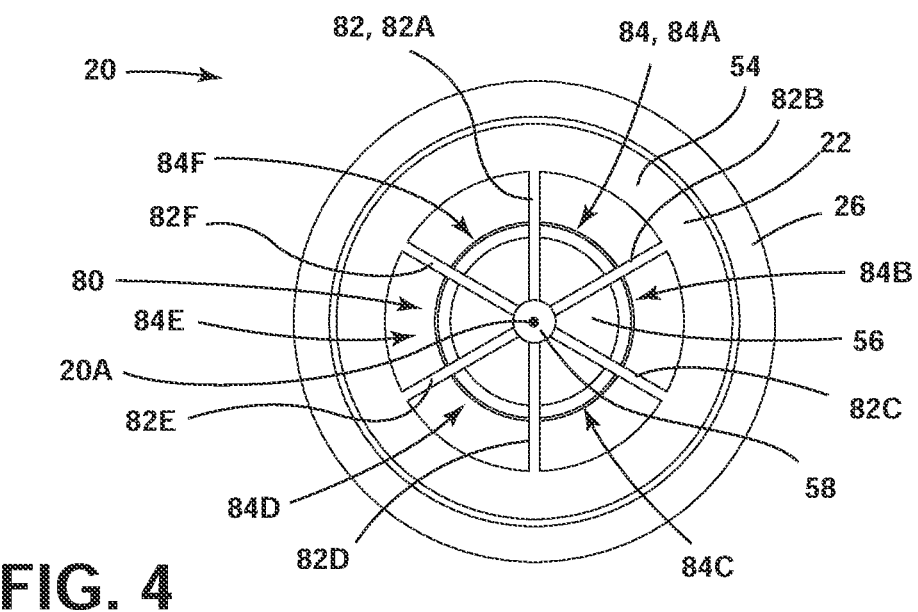
FIG. 4 is a top view generally illustrating portions of an embodiment of an air spring according to teachings of the present disclosure.

With embodiments, such as generally illustrated in FIG. 4, the radial extension 54 may include a void 80. In some example configurations, the base 56 may be at least partly accessible via the void 80. The projection 58 may extend from the base 56 in the axial direction (e.g., Z-direction). The projection 58 may have a generally cylindrical configuration.

In embodiments, the first member 22 may include a plurality of divider structures 82 such as a first divider structure 82A, a second divider structure 82B, a third divider structure 82C, a fourth divider structure 82D, a fifth divider structure 82E, and/or a sixth divider structure 82F. The divider structures 82 may be evenly spaced about the axis 20A and/or the projection 58. The divider structures 82 may be arranged to divide the void 80 into a plurality of void segments 84, such as a first void segment 84A, a void second segment 84B, a third void segment 84C, a fourth void segment 84D, a fifth void segment 84E, and/or a sixth void segment 84F. The first member 22 may include more or less than six divider structures 82 and/or void segments 84. The divider structures 82 may be connected to the radial extension 54, the base 56, and/or the projection 58. The divider structures 82 may be configured to add rigidity, strength, and/or structure to the first member 22.

With embodiments, the first member 22 may be comprised of a die casted aluminum, an injection molded polymer, and/or a hybrid material comprising both the aluminum and the polymer, among others.

Figure 5:
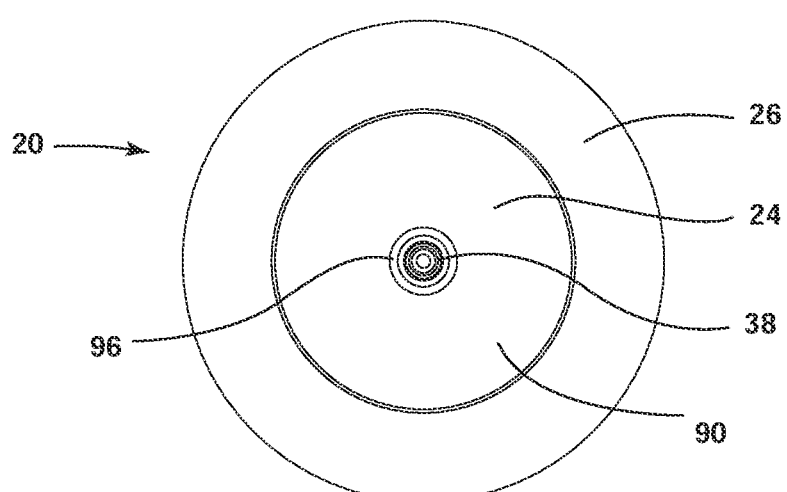
FIG. 5 is a bottom view generally illustrating portions of an embodiment of an air spring according to teachings of the present disclosure.

In embodiments, a second member 24 may comprise one or more of a variety of shapes, sizes, configurations, and/or materials. With embodiments, such as generally illustrated in FIG. 2, the second member 24 may include a base 90, a first axial extension 92, a second axial extension 94, and/or a conduit 96. The first axial extension 92, the second axial extension 94, and/or the conduit 96 may extend in the axial direction (e.g., Z-direction). For instance, the first axial extension 92 and/or the second axial extension 94 may extend from the base 90 in a first direction 98. The conduit 96 may extend from the base 90 in a second direction 100 that is opposite the first direction 98. The base 90 may have a generally circular configuration (see, e.g., FIG. 5).

With embodiments, such as generally illustrated in FIG. 2, the first axial extension 92 may include a radius 92R that is less than a radius 94R of the second axial extension 94. The first axial extension 92 may include and/or define a first cavity 110, the second axial connection 94 may include and/or define a second cavity 112, and/or the conduit 96 have include and/or define a third cavity 114. In some example configurations, the base 90 may include a hole 120 such that the first cavity 110 is in fluid communication with the third cavity 114 and/or the fluid connector 38. In some instances, the first cavity 110, the second cavity 112, and/or the third cavity 114 may be in fluid communication. The first cavity 110 may be configured to receive at least a portion of the isolator/bumper 28. The second cavity 112 may be configured to receive portions of the first member 22 and/or the isolator/bumper 28. The third cavity 114 may be configured to receive at least a portion of the fluid connector 38.

In embodiments, such as generally illustrated in FIGS. 1 and 2, the second member 24 may include a plurality of ring-shaped projections 122 and an additional projection 124. The ring-shaped projections 122 and/or the additional projection 124 may be configured to facilitate the connection of the second member 24 with one or more components of the air spring 20 (e.g., second clamp 32, second seal 36, and/or bellows 26). The ring-shaped projections 122 and/or the additional projection 124 may extend from an outer surface 126 of second axial extension 92, for example and without limitation, in the radial direction (e.g., X-direction). The additional projection 124 may be spaced apart from the ring-shaped projections 122. In some examples, the additional projection 124 may include a length 124L that is greater than a length 122L of a ring-shaped projection 122.

Figure 6:
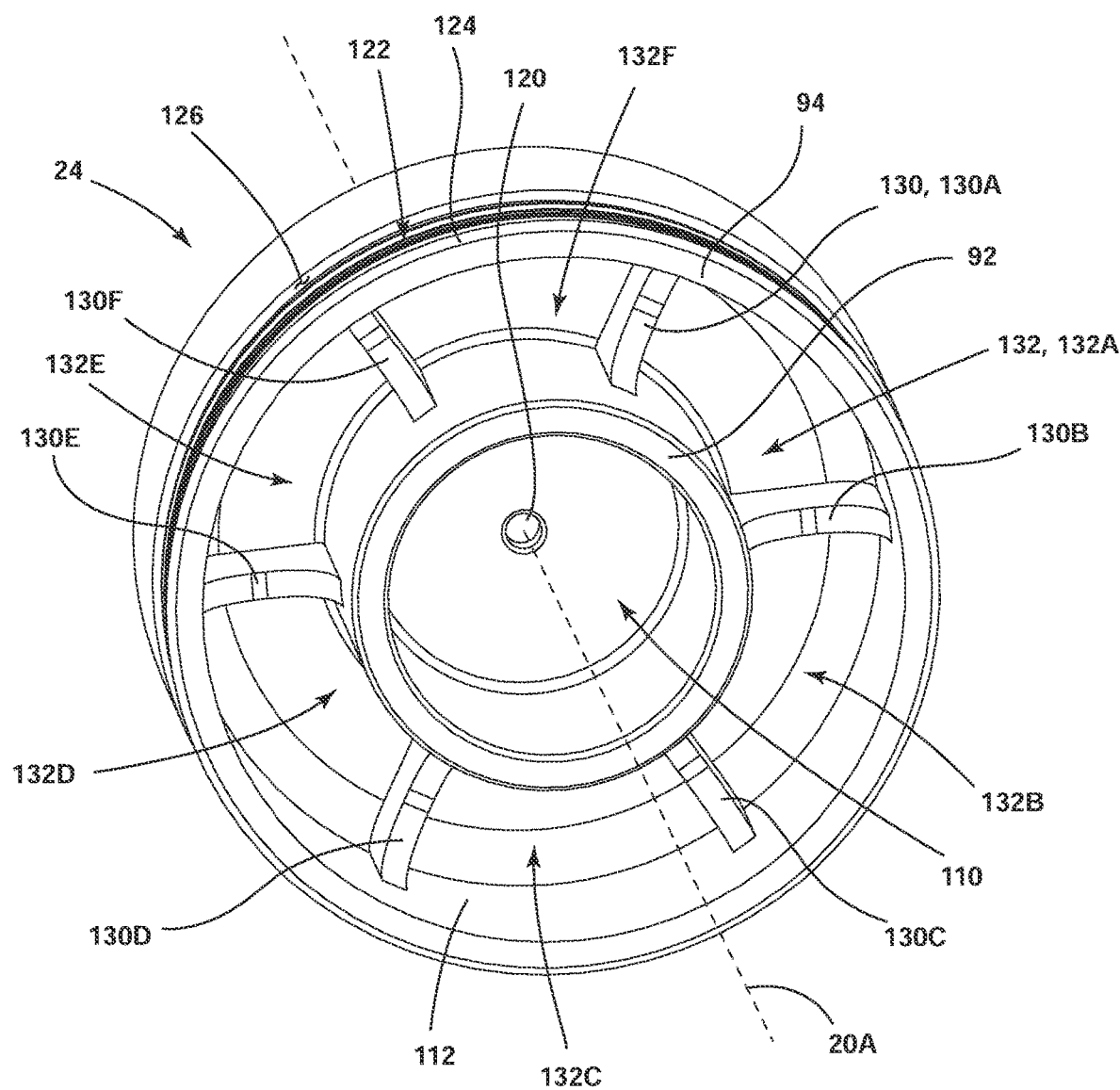
FIG. 6 is a perspective view generally illustrating embodiments of a second member according to teachings of the present disclosure.

In embodiments, such as generally illustrated in FIG. 6, the first axial extension 92 and/or the second axial extension 94 may have a generally cylindrical configuration. In some example configurations, the second member 24 may include a plurality of support structures 130 such as a first support structure 130A, a second support structure 130B, a third support structure 130C, a fourth support structure 130D, a fifth support structure 130E, and/or a sixth support structure 130F. The support structures 130 may be disposed within the second cavity 112 and/or between the first axial extension 92 and the second axial extension 94. The support structures 130 may be evenly spaced about the axis 20A and/or the first axial extension 92. The support structures 130 may be arranged to divide the second cavity 112 into a plurality of cavity segments 132, such as a first cavity segment 132A, a second cavity segment 132B, a third cavity segment 132C, a fourth cavity segment 132D, a fifth cavity segment 132E, and/or a sixth cavity segment 132F. The second member 24 may include more or less than six support structures and/or cavity segments 132. The support structures 130 may be configured to add rigidity, strength, and/or structure to the second member 24.

Figure 3:
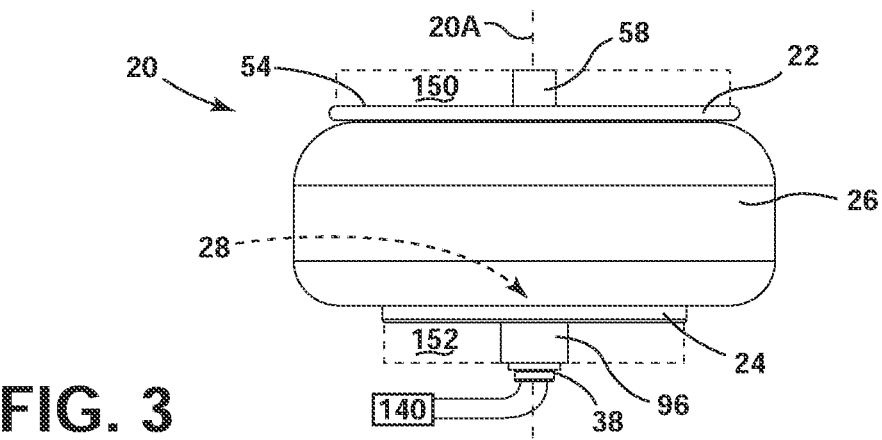
FIG. 3 is a side view generally illustrating portions of an embodiment of an air spring according to teachings of the present disclosure.

In embodiments, such as generally illustrated in FIGS. 1 and 3, the conduit 96 may have a generally cylindrical configuration. The conduit 96 may be configured for connection with the fluid connector 38. The fluid connector 38 may be configured for connection with an external fluid supply 140 (see, e.g., FIG. 3). In some example configurations, the fluid connector 38 may be substantially covered by the second member 24 (e.g., conduit 96, etc.) to protect the fluid connector 38 from unintentional damage.

With embodiments, such as generally illustrated in FIG. 3, the first member 22 may include and/or may be connected to a piston 150. The second member 24 may include and/or may be connected to a piston 152.

In embodiments, the second member 24 may be comprised of a die casted aluminum, an injection molded polymer, and/or a hybrid material comprising both the aluminum and the polymer, among others.

With embodiments, a flexible bellows 26 may comprise one or more of a variety of shapes, sizes, configurations, and/or materials. In embodiments, such as generally illustrated in FIGS. 2 and 3, the flexible bellows 26 may be connected to the first member 22 and/or the second member 24. For instance, the first clamp 30 and/or the first seal 34 may facilitate the connection of the bellows 26 to the first member 22. The second clamp 32 and/or the second seal 36 may facilitate the connection of the bellows 26 to the second member 24. In some example configurations, the first seal 34 and/or the second seal 36 may be formed integrally with the bellows 26. The bellows 26 may include and/or define a cavity 160. In an assembled configuration, the cavity 160 may be in fluid communication with the cavity 70 of the first member 22 and/or the cavities 110, 112, 114 of the second member 24. The bellows 26 may be configured to receive and selectively hold a pressurized fluid (e.g., gas, air, etc.) supplied from the fluid supply 140. The bellows 26 may define a pressurized fluid volume 162. The bellows 26 may be configured to facilitate the movement of the first member 22 relative to the second member 24 and/or to facilitate the movement of the second member 24 relative to the first member 22. For instance, the pressure of the fluid disposed within the cavity 160 may correlate to a distance the first member 22 is separated from the second member 24. In some examples, when the pressure of the fluid increases so may the distance between the first member 22 and the second member 24 and/or when the pressure of the fluid decrease so may the distance between the first member 22 and the second member 24.

In embodiments, the bellows 26 may include a first rolling fold 164 and a second rolling fold 166. The first rolling fold 164 and the second rolling fold 166 may collectively define double rolling folds. In some examples, the bellows 26 may comprise a reinforced (e.g., fabric, chord, and/or variable angle windings, among others) rubber material.

With embodiments, such as generally illustrated in FIG. 2, in an assembled configuration, the curved portion 52 of the first member 22 may be disposed adjacent to the bellows 26. In some example configurations, the outer radial extension 54 of the first member 22 may extend outwardly radial beyond an upper apex/tangent point 170 of the bellows 26. In some instances, when the vehicle 42 is in a k0-position, the upper apex/tangent point 170 of the bellows 26 may be in direct contact with the outer radial extension 54.

Figure 7:
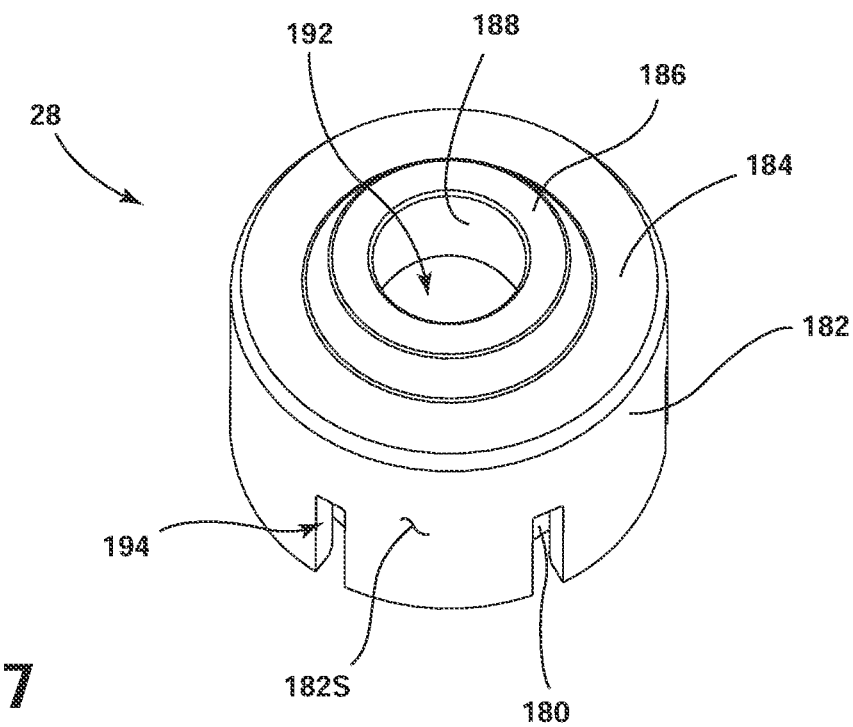
FIG. 7 is a perspective view generally illustrating embodiments of an isolator/bumper according to teachings of the present disclosure.
Figure 8:
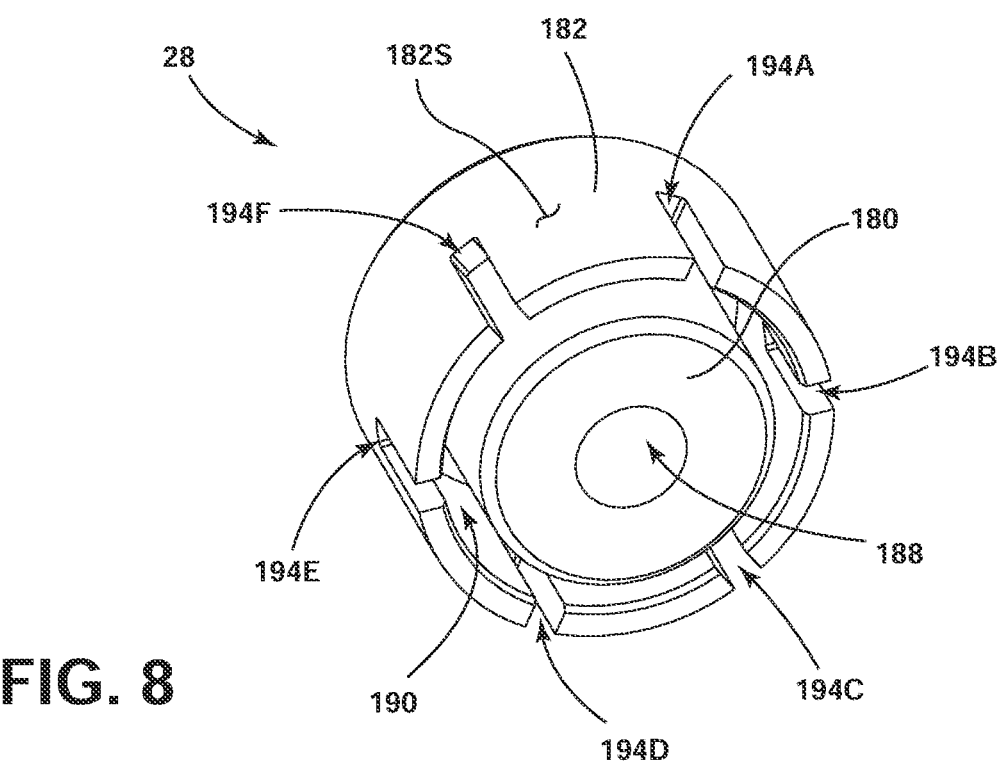
FIG. 8 is a perspective view generally illustrating embodiments of an isolator/bumper according to teachings of the present disclosure.

In embodiments, an isolator/bumper 28 may comprise one or more of a variety of shapes, sizes, configurations, and/or materials. With embodiments, such as generally illustrated in FIGS. 2, 7, and 8, the isolator/bumper 28 may include an inner radial portion 180, an outer radial portion 182, a connecting radial portion 184, a conical portion 186, an inner fluid passage 188, and/or a cavity 190. In some instances, the isolator/bumper 28 may be configured to reduce and/or prevent radial movement (e.g., X-direction) of the first member 22 relative to the second member 24 and/or the second member 24 relative to the first member 22. The isolator/bumper 28 may be configured to function as a bumper and/or a stop between the first member 22 and the second member 24.

With embodiments, the inner radial portion 180 may be connected to the outer radial portion 182 via the connecting radial portion 184. The inner radial portion 180 may be disposed radially inward of the outer radial portion 182. In some example configurations, a vertical length 182L of the outer radial portion 182 may be greater than a vertical length 50L of the axial member 50 of the first member 22 (see, e.g., FIG. 2). In some examples, the length 182L of the outer radial portion 182 may be at least 0.50 of a total vertical length 28L of the isolator/bumper 28. The length 182L of the outer radial portion 182 may be at least 0.75 of a total vertical length 28L of the isolator/bumper 28. The length 182L of the outer radial portion 182 may be at least 0.80 of a total vertical length 28L of the isolator/bumper 28.

In embodiments, the inner fluid passage 188 may be disposed within the inner radial portion 180. The conical portion 186 may extend from the connecting portion 184 (e.g., in the Z-direction). The conical portion 186 may include an aperture 192 in fluid communication with the inner fluid passage 188. The aperture 192 may be configured to release pressurized fluid from inner fluid passage 188. The cavity 190 may be disposed between the inner radial portion 180 and the outer radial portion 182.

With embodiments, in an assembled configuration, the inner fluid passage 188 may be in fluid communication with the cavity 160 of the bellows 26, the cavity 70 of the first member 22, the cavities 110, 112, 114 of the second member 24, and/or the fluid connector 38 (see, e.g., FIG. 2). The inner fluid passage 188 may be configured to help facilitate the transfer of pressurized fluid (e.g., gas, air, etc.) from the fluid supply 140 to the cavity 160 of the bellows 26.

In embodiments, in some example configurations, the inner radial portion 180 and the outer radial portion 182 may be integrally formed. The isolator/bumper 28 may be comprised of a rubber material, among others. In some instances, the isolator/bumper 28 may be comprised of micro cellular polyurethane (MCU). The outer radial portion 182 and/or an outer surface 182S of the outer radial portion 182 may comprise a low friction material such as a low-friction rubber. For example and without limitation, the outer radial portion 182 and/or the outer surface 182S of the outer radial portion 182 may comprise polytetrafluoroethylene (PTFE). In some example configurations, the outer surface 182S of the outer radial portion 182 may be textured. The length 28L of the isolator/bumper 28 and/or the material of the isolator/bumper 28 may be selected and/or adjusted such that the isolator/bumper 28 has a desired height and/or stiffness.

Figure 9:
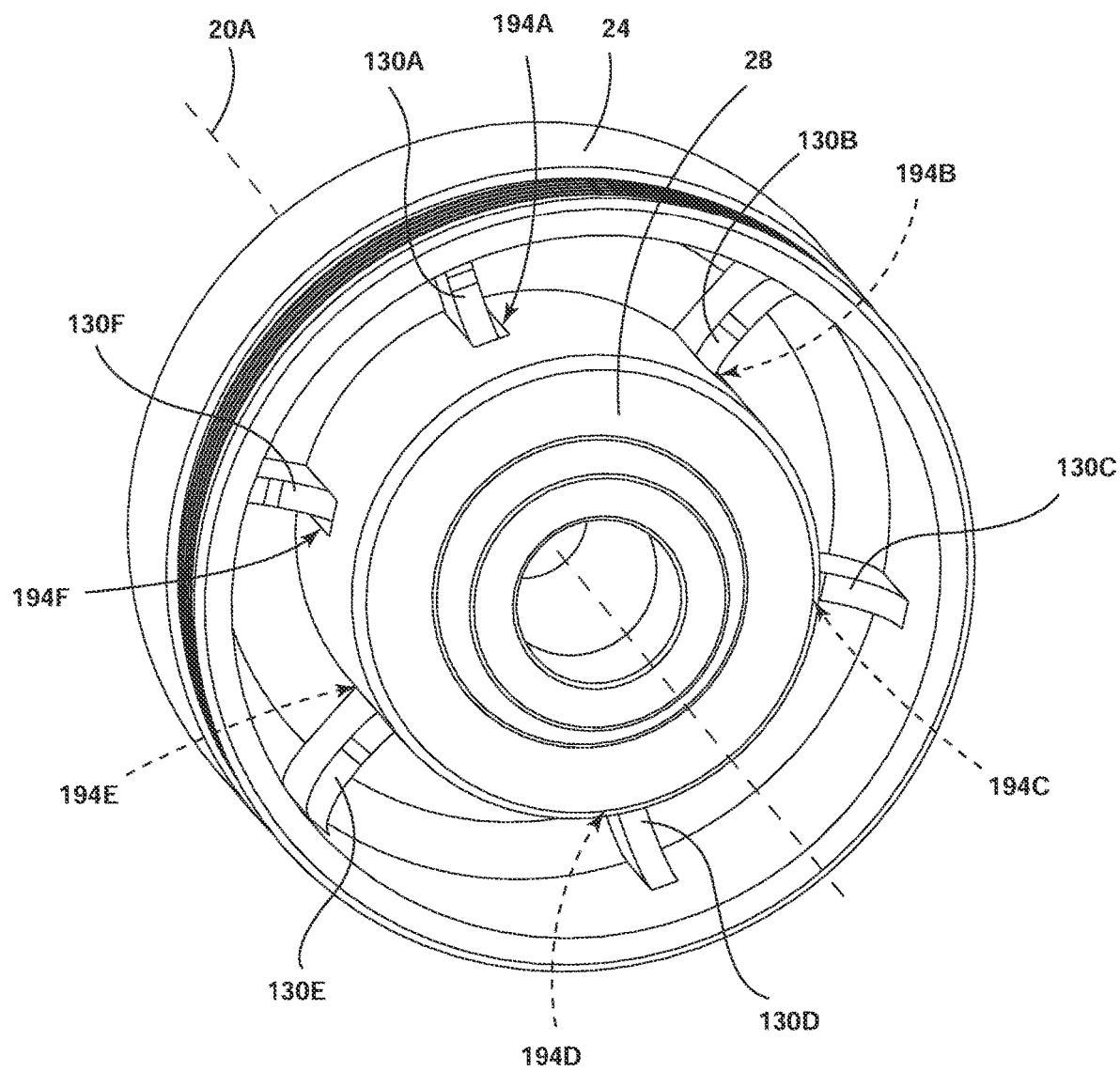
FIG. 9 is a perspective view generally illustrating embodiments of an isolator/bumper connected with a second member according to teachings of the present disclosure.

With embodiments, such as generally illustrated in FIGS. 7-9, the isolator/bumper 28 may include a plurality of axial extending voids 194 (e.g., notches, etc.), such as a first void 194A, a second void 194B, a third void 194C, a fourth void 194D, a fifth void 194E, and/or a sixth void 194F. The voids 194 may be disposed within the outer radial portion 182 and/or may be evenly spaced about the axis 20A. The voids 194 may be arranged such as to correspond to the support structures 130 of the second member 22. The isolator/bumper 28 may include more or less than six voids 194.

In embodiments, such as generally illustrated in FIG. 9, in an assembled configuration the isolator/bumper 28 may be connected to the second member 24. In some example configurations, the isolator/bumper 28 may be connected to the second member 24 such that the isolator/bumper 28 is restricted and/or prevented from axially rotating (e.g., about axis 20A). For instance, the isolator/bumper 28 may be connected to the second member 24 such that each of the support structures 130A-130F of the second member 22 is at least partially disposed within in a corresponding void 194A-194F of the isolator/bumper 28. The isolator/bumper 28 may be disposed at various locations within the air spring 20 and/or may be connected to additional components (e.g., first member 22, etc.) of the air spring 20.

With embodiments, such as generally illustrated in FIG. 2, in an assembled configuration, the isolator/bumper 28 may be connected to the second member 24 such that the first axial extension 92 of the second member 24 is disposed within the cavity 190 of the isolator/bumper 28 and/or the isolator/bumper 28 is restricted and/or prevented from moving relative to the second member 24 in the radial direction (e.g., X-direction). The inner radial portion 180 of the isolator/bumper 28 may be disposed radially inward of the axial extension 50 of the first member 22 and/or the first axial extension 92 of the second member 24. The outer radial portion 182 of the isolator/bumper 28 may be disposed radially outward of the first axial extension 92 of the second member 24. The outer radial portion 182 of the isolator/bumper 28 may be radially disposed between the first axial extension 92 of the second member 24 and the axial extension 50 of the first member 22.

In embodiments, in an assembled configuration, the air spring 20 may include a bellows gap 196 and/or a bumper gap 198. The bellows gap 196 may include a distance between an inner surface 26S of the bellows 26 and an inner surface 94S of the second axial extension 94 of the second member 22. The bumper gap 198 may include a distance between the outer surface 182S of the outer radial portion 182 of the isolator/bumper 28 and an inner surface 50S of the axial extension 50 of the first member 22. In some examples, the bellows gap 196 may be greater than the bumper gap 198.

With embodiments, during operation of the air spring 20, the axial extension 50 of the first member 22 may contact the outer surface 182S of the outer radial portion 182 of the isolator/bumper 28 such that the first member 22 is restricted and/or prevented from moving relative to the second member 24 in the radial direction (e.g., X-direction) and the bellows 26 is prevented from damage via unintentional contact with a component of the air spring (e.g., second member 22, etc.).

Figure 10:
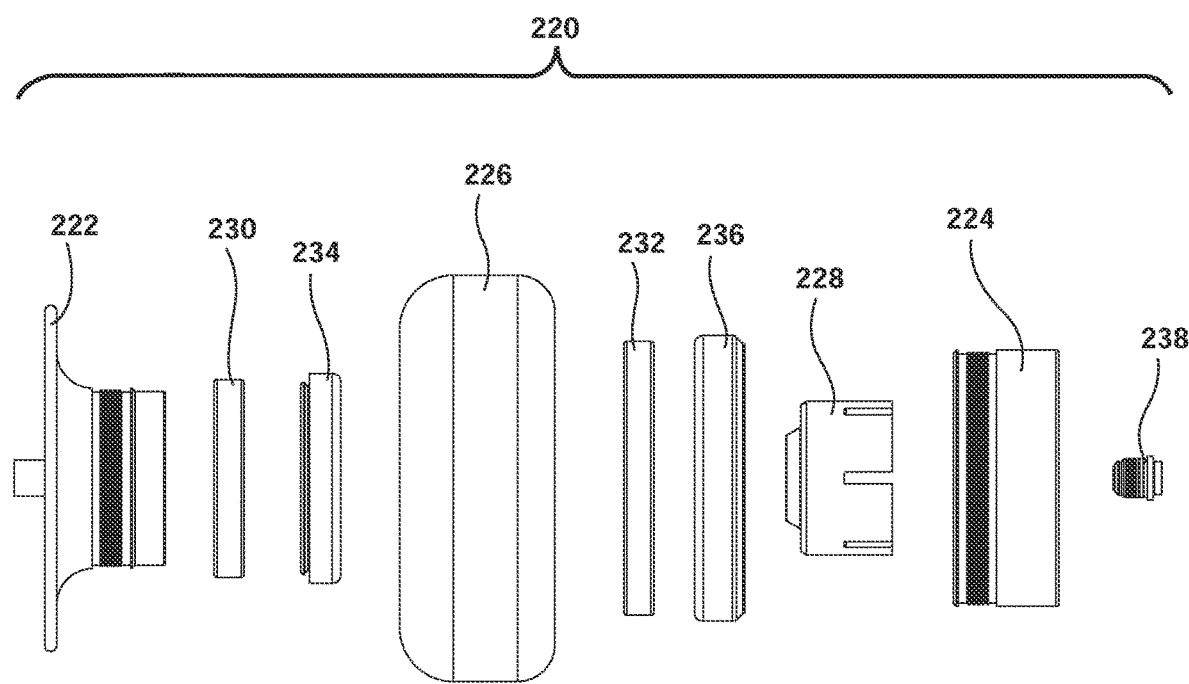
FIG. 10 is an exploded side view generally illustrating portions of an embodiment of an air spring according to teachings of the present disclosure.
Figure 10:
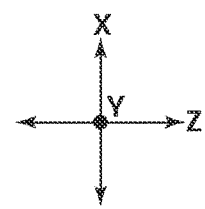
Figure 11:
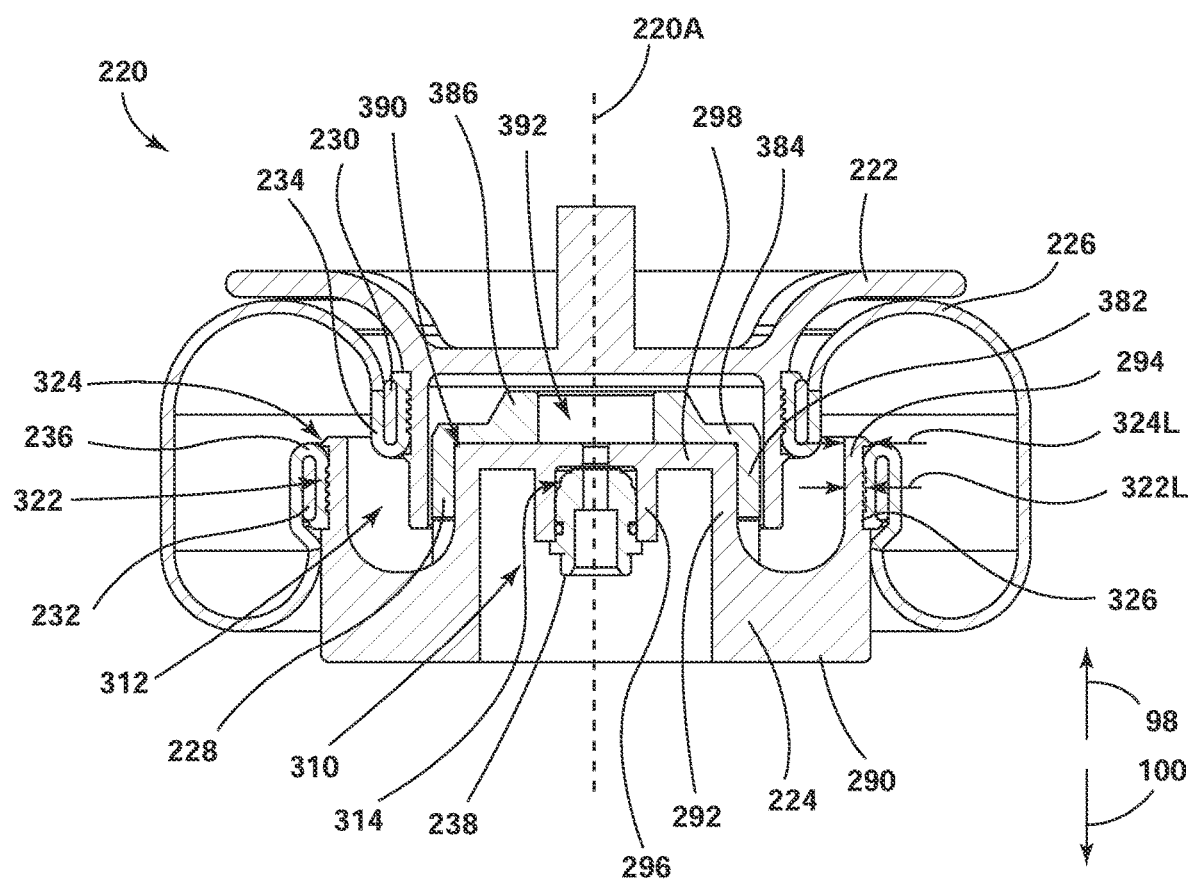
FIG. 11 is a cross-sectional view generally illustrating portions of an embodiment of an air spring according to teachings of the present disclosure.

In embodiments, such as generally illustrated in FIGS. 10 and 11, an air spring 220 may be configured in a similar manner as the air spring 20. For example and without limitation, the air spring 220 may include a first member 222, a second member 224, a flexible bellows 226, an isolator/bumper 228, a first clamp 230, a second clamp 232, a first seal 234, a second seal 236, and/or a fluid connector 238. The first member 222 may be configured to facilitate connection of the air spring 220 with a first external component or structure 40 of vehicle 42 (e.g., a vehicle body, a vehicle frame, and/or a vehicle component, among others) and the second member 224 may be configured to facilitate connection of the air spring 220 with a second external component or structure 44 of the vehicle 42 (e.g., a vehicle body, a vehicle frame, and/or a vehicle component, among others). The air spring 220 may be configured to restrict, dampen, and/or absorb relative movement between the first external component 40 and the second external component 44. The air spring 220 may include an axis 220A (e.g., a central axis) that may extend in the Z-direction (see, e.g., FIG. 11).

With embodiments, the first member 222 may be configured in the same or a similar manner as the first member 22 of the air spring 20. The flexible bellows 226 may be configured in the same or a similar manner as the flexible bellows 26 of the air spring 20. The first clamp 230 may be configured in the same or a similar manner as the first clamp 30 of the air spring 20. The second clamp 232 may be configured in the same or a similar manner as the second clamp 32 of the air spring 20. The first seal 234 may be configured in the same or a similar manner as the first seal 34 of the air spring 20. The second seal 236 may be configured in the same or a similar manner as the second seal 36 of the air spring 20. The first seal 234 and/or the second seal 236 may be formed integrally with the bellows 226. The fluid connector 238 may be configured in the same or a similar manner as the fluid connector 38 of the air spring 20.

Figure 12:
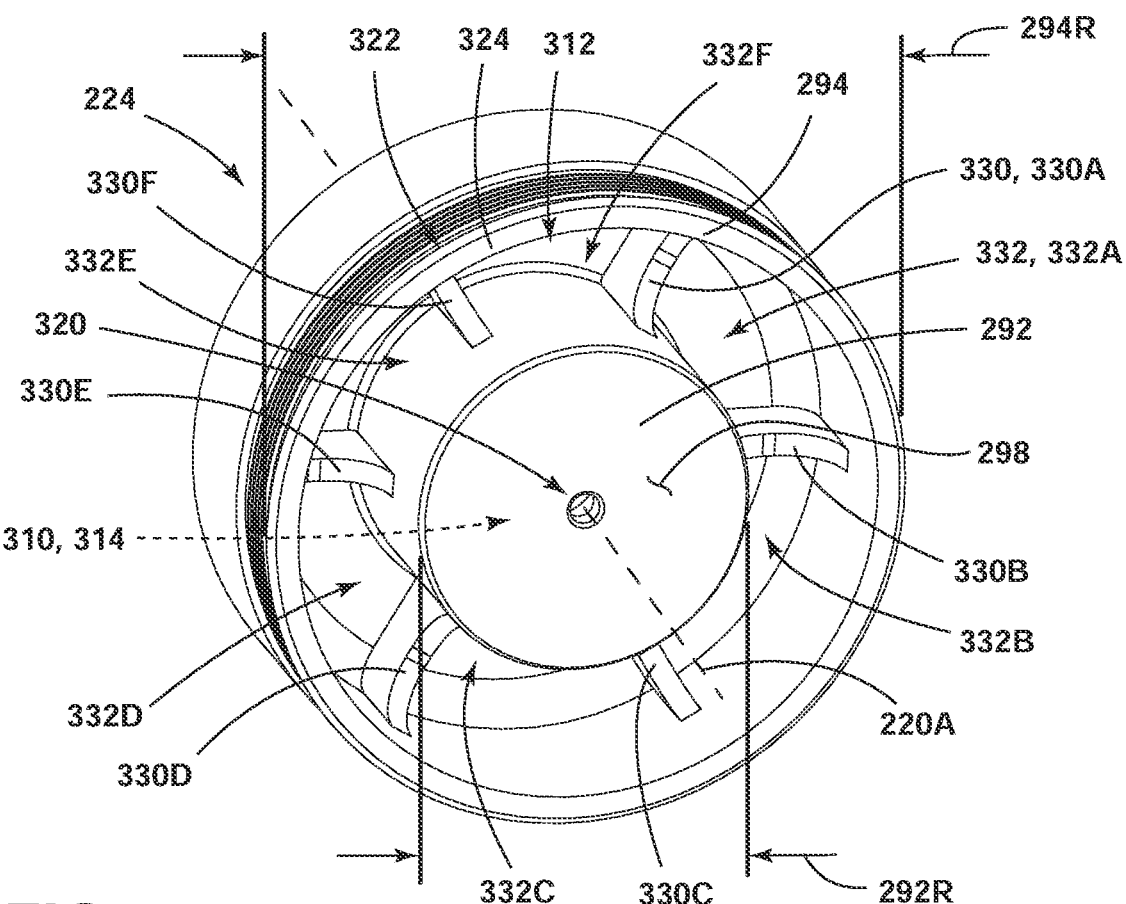
FIG. 12 is a perspective view generally illustrating embodiments of a second member according to teachings of the present disclosure.

In embodiments, the second member 224 may comprise one or more of a variety of shapes, sizes, configurations, and/or materials. With embodiments, such as generally illustrated in FIGS. 11 and 12, the second member 224 may include a base 290, a first axial extension 292, a second axial extension 294, and/or a conduit 296. The first axial extension 292 may include a support surface 298. The support surface 298 may be spaced apart from the base 290. The support surface 298 may be configured to support and/or engage the isolator/bumper 228. The support surface 298 and/or the base 290 may have a generally circular configuration.

With embodiments, the first axial extension 292, the second axial extension 294, and/or the conduit 296 may extend in the axial direction (e.g., Z-direction). For instance, the first axial extension 292 and/or the second axial extension 294 may extend from the base 290 in the first direction 98. The conduit 296 may extend from the support surface 298 in a second direction 100 that is opposite the first direction 98.

In embodiments, the first axial extension 292 may include a radius 292R that is less than a radius 294R of the second axial extension 294. The first axial extension 292 may include and/or define a first cavity 310, the second axial connection 294 may include and/or define a second cavity 312, and/or the conduit 296 have include and/or define a third cavity 314. In some example configurations, the support surface 298 may include a hole 320 such that the first cavity 310, the third cavity 314, and/or the fluid connector 238 are in fluid communication. The second cavity 112 may be configured to receive portions of the first member 222 and/or the isolator/bumper 228. The third cavity 314 may be configured to receive at least a portion of the fluid connector 238. In embodiments, a fluid connector may, inter alia, be more protected—for example, the connector may be surrounded by a lower member. Further, a bumper may be provided that is stiffer, as its height may be comparatively reduced (e.g., with respect to that illustrated in FIG. 2). With embodiments, by turning the position of the support surface 298, the stiffness/length of the bumper can be adapted to meet requirements—which may provide positions between those shown, for example and without limitations, in FIG. 2 (e.g., all the way down) and FIG. 11 (e.g., all the way up). In embodiments, a bumper may be disposed in a pocket, as that can help stabilize radial movement.

In embodiments, such as generally illustrated in FIGS. 11 and 12, the second member 224 may include a plurality of ring-shaped projections 322 and an additional projection 324. The ring-shaped projections 322 and/or the additional projection 324 may be configured to facilitate the connection of the second member 224 with one or more components of the air spring 220 (e.g., second clamp 232, second seal 236, and/or bellows 226). The ring-shaped projections 322 and/or the additional projection 324 may extend from an outer surface 326 of second axial extension 292, for example and without limitation, in the radial direction (e.g., X-direction). The additional projection 324 may be spaced apart from the ring-shaped projections 322. In some examples, the additional projection 324 may include a length 324L that is greater than a length 322L of a ring-shaped projection 322.

In embodiments, such as generally illustrated in FIG. 12, the first axial extension 292 and/or the second axial extension 294 may have a generally cylindrical configuration. In some example configurations, the second member 224 may include a plurality of support structures 330 such as a first support structure 330A, a second support structure 330B, a third support structure 330C, a fourth support structure 330D, a fifth support structure 330E, and/or a sixth support structure 330F. The support structure 330 may be disposed within the second cavity 312 and/or between the first axial extension 292 and the second axial extension 294. The support structures 330 may be evenly spaced about the axis 220A and/or the first axial extension 292. The support structures 330 may be arranged to divide the second cavity 312 into a plurality of cavity segments 332, such as a first cavity segment 332A, a second cavity segment 332B, a third cavity segment 332C, a fourth cavity segment 332D, a fifth cavity segment 332E, and/or a sixth cavity segment 332F. The second member 224 may include more or less than six support structures and/or cavity segments 332. The support structures 330 may be configured to add rigidity, strength, and/or structure to the second member 224.

In embodiments, the conduit 296 may have a generally cylindrical configuration. The conduit may be configured for connection with the fluid connector 238. The fluid connector 38 may be configured for connection with an external fluid supply.

With embodiments, the second member 24 may be comprised of a die casted aluminum, an injection molded polymer, and/or a hybrid material comprising both the aluminum and the polymer, among others.

In embodiments, an isolator/bumper 228 may comprise one or more of a variety of shapes, sizes, configurations, and/or materials. With embodiments, such as generally illustrated in FIGS. 11 and 12, the isolator/bumper 228 may include an outer radial portion 382, a connecting radial portion 384, a conical portion 386 (e.g., an inner radial portion), and/or a cavity 390. In some instances, the isolator/bumper 228 may be configured to reduce and/or prevent radial movement (e.g., X-direction) of the first member 222 relative to the second member 224 and/or the second member 224 relative to the first member 222. The isolator/bumper 228 may be configured to function as a bumper and/or a stop between the first member 222 and the second member 224.

With embodiments, the outer radial portion 382 may extend from the connecting radial portion 384 in the axial direction. The conical portion 386 may extend from the connecting portion 384 in the axial direction. The conical portion 386 may extend from the connecting portion 384 in a direction that is opposite the outer radial portion 382. The conical portion 386 may include an aperture 392 that may be in fluid communication with the cavity 390. In an assembled configuration, the aperture 392 may be in fluid communication with the hole 320 of the second member 222, the third cavity 314 of second member 222, and/or the fluid connector 238. The cavity 190 may be configured to receive at least a portion of the second member 222.

In embodiments, the isolator/bumper 228 may be comprised of a rubber material, among others. In some instances, the isolator/bumper 228 may be comprised of micro cellular polyurethane (MCU). The outer radial portion 382 and/or an outer surface 382S of the outer radial portion 382 may comprise a low friction material such as a low-friction rubber. For example and without limitation, the outer radial portion 382 and/or the outer surface 382S of the outer radial portion 382 may comprise polytetrafluoroethylene (PTFE). In some example configurations, the outer surface 382S of the outer radial portion 382 may be textured.

Figure 13:
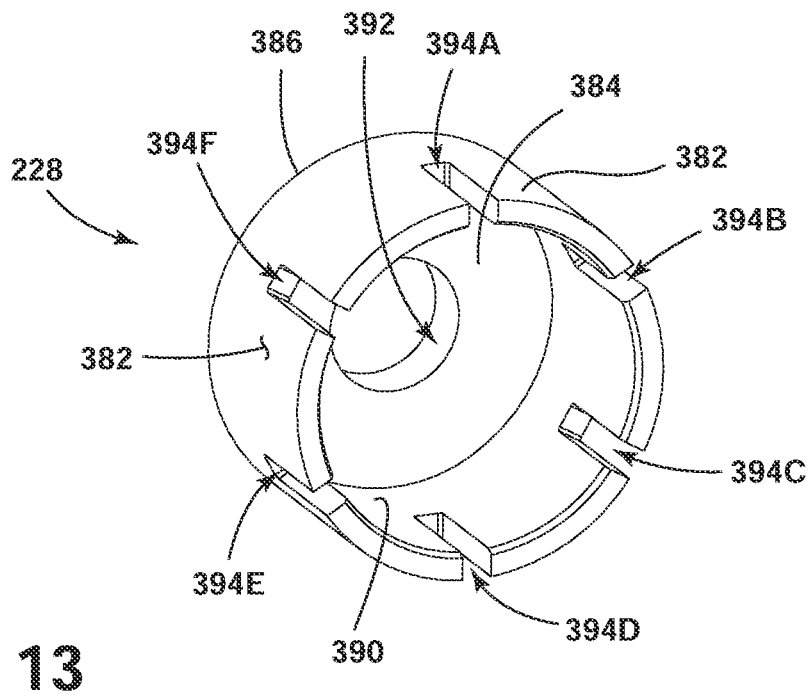
FIG. 13 is a perspective view generally illustrating embodiments of an isolator/bumper according to teachings of the present disclosure.

With embodiments, such as generally illustrated in FIG. 13, the isolator/bumper 228 may include a plurality of axial extending voids 394, such as a first void 394A, a second void 394B, a third void 394C, a fourth void 394D, a fifth void 394E, and/or a sixth void 394F. The voids 394 may be disposed within the outer radial portion 382 and/or may be evenly spaced about the axis 220A. The voids 394 may be arranged such as to correspond to the support structures 330 of the second member 222. The isolator/bumper 228 may include more or less than six voids 394.

In embodiments, in an assembled configuration the isolator/bumper 228 may be connected to the second member 224. In some example configurations, the isolator/bumper 228 may be connected to the second member 224 such that the isolator/bumper 228 is restricted and/or prevented from axially rotating (e.g., about axis 220A). For instance, the isolator/bumper 228 may be connected to the second member 224 such that each of the support structures 330A-330F of the second member 222 is at least partially disposed within in a corresponding void 394A-394F of the isolator/bumper 228.

With embodiments, such as generally illustrated in FIG. 11, in an assembled configuration, the isolator/bumper 228 may be connected to the second member 224 such that at least a portion of the first axial extension 292 of the second member 224 is disposed within the cavity 390 of the isolator/bumper 28 and/or the isolator/bumper 228 is restricted and/or prevented from moving relative to the second member 224 in the radial direction (e.g., X-direction). The isolator/bumper 228 may be connected to the second member 224 such that the isolator/bumper 228 is in contact with the support surface 298 and/or the first axial extension 292 of the second member 224. The outer radial portion 382 of the isolator/bumper 228 may be disposed radially outward of the first axial extension 292 of the second member 224.

Figure 14:
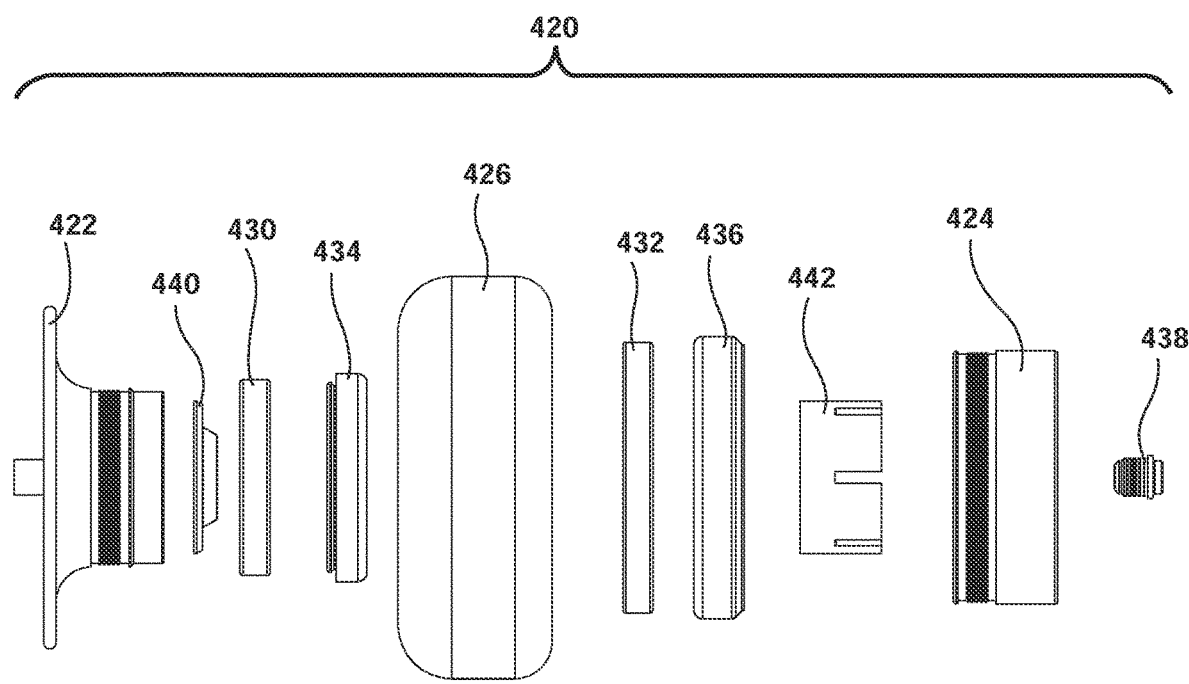
FIG. 14 is an exploded side view generally illustrating portions of an embodiment of an air spring according to teachings of the present disclosure.
Figure 14:
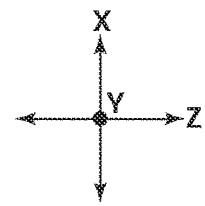
Figure 15:
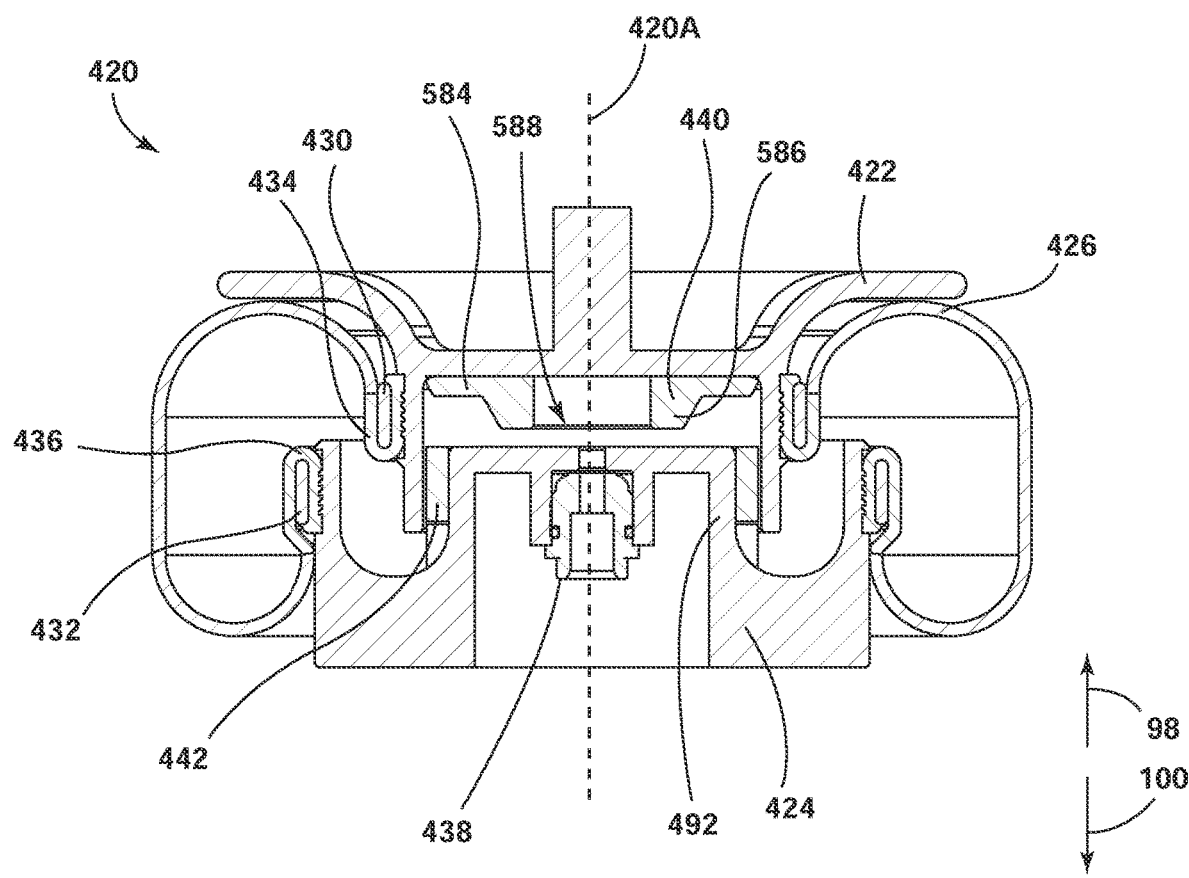
FIG. 15 is a cross-sectional view generally illustrating portions of an embodiment of an air spring according to teachings of the present disclosure.

In embodiments, such as generally illustrated in FIGS. 14 and 15, an air spring 420 may include a first member 422, a second member 424, a flexible bellows 426, a first clamp 430, a second clamp 432, a first seal 434, a second seal 436, a fluid connector 438, a bumper 440, and/or a control element 442. The first member 422 may be configured to facilitate connection of the air spring 420 with a first external component or structure 40 of vehicle 42 (e.g., a vehicle body, a vehicle frame, and/or a vehicle component, among others) and the second member 424 may be configured to facilitate connection of the air spring 420 with a second external component or structure 44 of the vehicle 42 (e.g., a vehicle body, a vehicle frame, and/or a vehicle component, among others). The air spring 420 may be configured to restrict, dampen, and/or absorb relative movement between the first external component 40 and the second external component 44. The air spring 420 may include an axis 420A (e.g., a central axis) that may extend in the Z-direction (see, e.g., FIG. 15).

With embodiments, the first member 422 may be configured in the same or a similar manner as the first member 22 of the air spring 20. The second member 424 may be configured in the same or similar manner as the second member 224 of the air spring 220. The flexible bellows 426 may be configured in the same or a similar manner as the flexible bellows 26 of the air spring 20. The first clamp 430 may be configured in the same or a similar manner as the first clamp 30 of the air spring 20. The second clamp 432 may be configured in the same or a similar manner as the second clamp 32 of the air spring 20. The first seal 434 may be configured in the same or a similar manner as the first seal 34 of the air spring 20. The second seal 436 may be configured in the same or a similar manner as the second seal 36 of the air spring 20. The first seal 434 and/or the second seal 436 may be formed integrally with the bellows 426. The fluid connector 438 may be configured in the same or a similar manner as the fluid connector 38 of the air spring 20.

Figure 16:
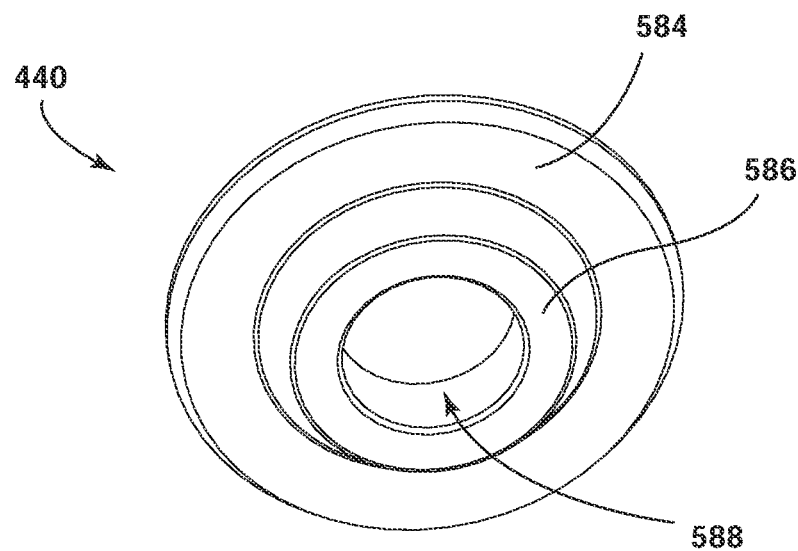
FIG. 16 is a perspective view generally illustrating embodiments of a bumper according to teachings of the present disclosure.

In embodiments, the bumper 440 may comprise one or more of a variety of shapes, sizes, configurations, and/or materials. With embodiments, such as generally illustrated in FIGS. 14-16, the bumper 440 may an include a radial portion 584, a conical portion 586 (e.g., an inner radial portion), and/or an inner passage 588. In some instances, the bumper 440 may be configured to function as a bumper and/or a stop between the first member 422 and the second member 424.

With embodiments, the conical portion 586 may extend from the radial portion 584 in the axial direction. The inner passage 588 may extend through the radial portion 584 and/or the conical portion 586. The radial portion 584 may have a generally circular configuration (see, e.g., FIG. 16). In embodiments, such as generally illustrated in FIG. 15, the bumper 440 may be connected to the first member 422. In some examples, the radial portion 584 may be disposed adjacent to the first member 422 and/or the conical portion 586 may be disposed facing away from the first member 422. The bumper 440 may be connected to the first member 422 via vulcanization.

In embodiments, the bumper 440 may be comprised of an elastic material such as a rubber material and/or a thermoplastic elastomer (TPE), among others. In some instances, the bumper 440 may be comprised of micro cellular polyurethane (MCU).

Figure 17:
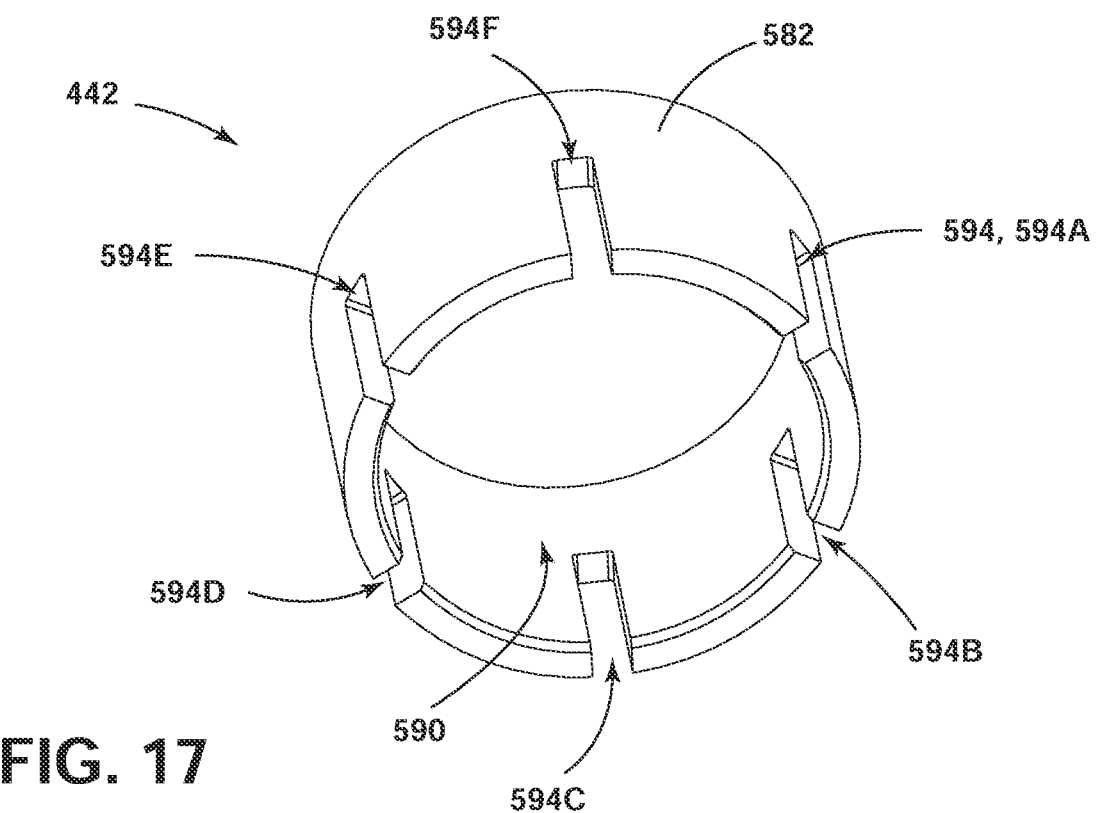
FIG. 17 is a perspective view generally illustrating embodiments of a control element according to teachings of the present disclosure.

In embodiments, the control element 442 may comprise one or more of a variety of shapes, sizes, configurations, and/or materials. With embodiments, such as generally illustrated in FIGS. 15 and 17, the control element 442 may include an outer radial portion 582 and/or a cavity 590. In some instances, the control element 442 may be configured to reduce and/or prevent radial movement (e.g., X-direction) of the first member 422 relative to the second member 424 and/or the second member 424 relative to the first member 422.

With embodiments, such as generally illustrated in FIG. 17, the control element 442 may include a plurality of axial extending voids 594, such as a first void 594A, a second void 594B, a third void 594C, a fourth void 594D, a fifth void 594E, and/or a sixth void 594F. The voids 594 may be disposed within the outer radial portion 582 and/or may be evenly spaced about the axis 420A. The voids 594 may be arranged such as to correspond to the support structures of the second member 424. The control element 442 may include more or less than six voids 594.

In embodiments, in an assembled configuration the control element 442 may be connected to the second member 424. In some example configurations, the control element 442 may be connected to the second member 424 such that the control element 442 is restricted and/or prevented from axially rotating (e.g., about axis 420A). For instance, the control element 442 may be connected to the second member 424 such that each of the support structures of the second member 222 is at least partially disposed within in a corresponding void 594A-594F of the control element 442.

With embodiments, the control element 442 may be comprised of an elastic material such as a rubber material and/or a thermoplastic elastomer (TPE), among others. In some instances, the control element 442 may be comprised of micro cellular polyurethane (MCU).

In embodiments, such as generally illustrated in FIG. 15, in an assembled configuration, the control element 442 may be connected to the second member 424 such that at least a portion of the first axial extension 492 of the second member 424 is disposed within the cavity 590 of the control element 442 and/or the control element 442 is restricted and/or prevented from moving relative to the second member 424 in the radial direction (e.g., X-direction). The outer radial portion 582 of the control element 442 may be disposed radially outward of the first axial extension 492 of the second member 424.

Figure 18:
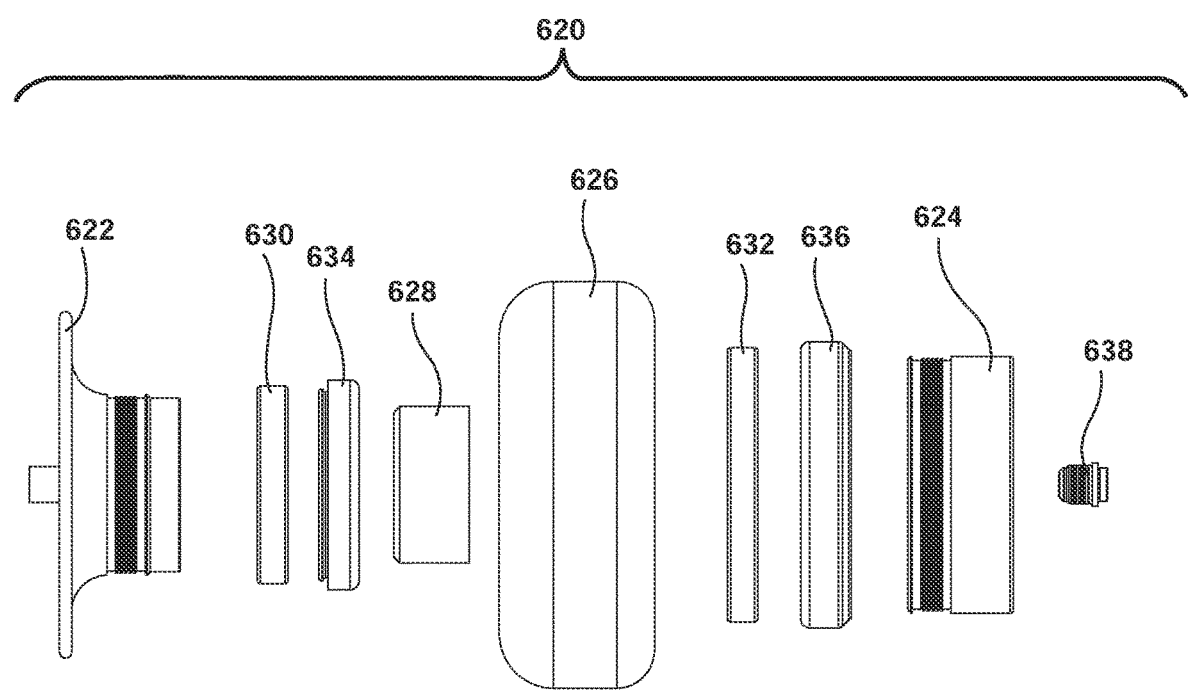
FIG. 18 is an exploded side view generally illustrating portions of an embodiment of an air spring according to teachings of the present disclosure.
Figure 18:
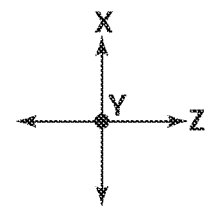
Figure 19:
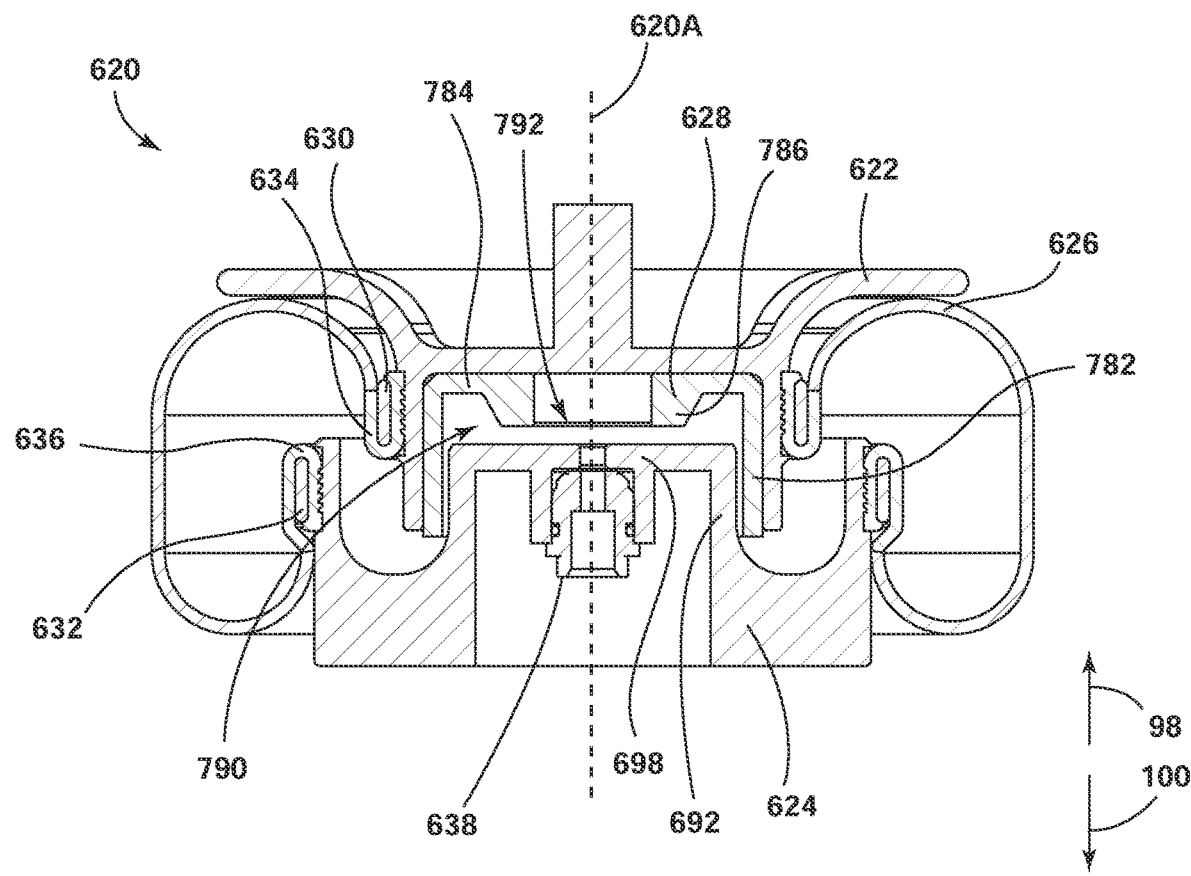
FIG. 19 is a cross-sectional view generally illustrating portions of an embodiment of an air spring according to teachings of the present disclosure.

With embodiments, such as generally illustrated in FIGS. 18 and 19, an air spring 620 may include a first member 622, a second member 624, a flexible bellows 626, an isolator/bumper 628, a first clamp 630, a second clamp 632, a first seal 634, a second seal 636, and/or a fluid connector 638. The first member 622 may be configured to facilitate connection of the air spring 620 with a first external component or structure 40 of vehicle 42 (e.g., a vehicle body, a vehicle frame, and/or a vehicle component, among others) and the second member 624 may be configured to facilitate connection of the air spring 620 with a second external component or structure 44 of the vehicle 42 (e.g., a vehicle body, a vehicle frame, and/or a vehicle component, among others). The air spring 620 may be configured to restrict, dampen, and/or absorb relative movement between the first external component 40 and the second external component 44. The air spring 620 may include an axis 620A (e.g., a central axis) that may extend in the Z-direction (see, e.g., FIG. 19).

With embodiments, the first member 622 may be configured in the same or a similar manner as the first member 22 of the air spring 20. The second member 624 may be configured in the same or similar manner as the second member 224 of the air spring 220. The flexible bellows 626 may be configured in the same or a similar manner as the flexible bellows 26 of the air spring 20. The first clamp 630 may be configured in the same or a similar manner as the first clamp 30 of the air spring 20. The second clamp 632 may be configured in the same or a similar manner as the second clamp 32 of the air spring 20. The first seal 634 may be configured in the same or a similar manner as the first seal 34 of the air spring 20. The second seal 636 may be configured in the same or a similar manner as the second seal 36 of the air spring 20. The first seal 634 and/or the second seal 636 may be formed integrally with the bellows 626. The fluid connector 638 may be configured in the same or a similar manner as the fluid connector 38 of the air spring 20.

Figure 20:
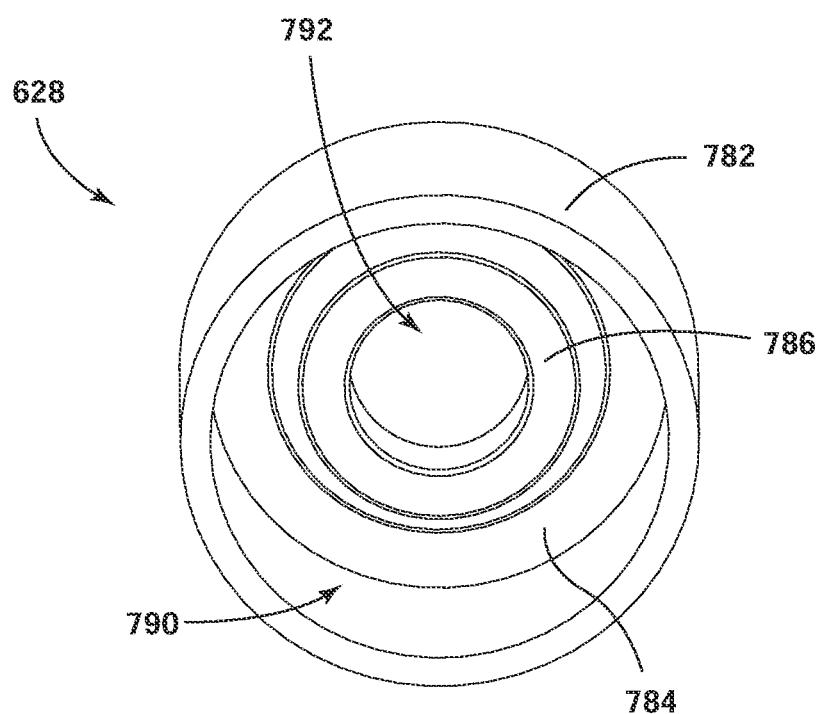
FIG. 20 is a perspective view generally illustrating embodiments of an isolator/bumper according to teachings of the present disclosure.

In embodiments, an isolator/bumper 628 may comprise one or more of a variety of shapes, sizes, configurations, and/or materials. With embodiments, such as generally illustrated in FIGS. 19 and 20, the isolator/bumper 628 may include a radial portion 782, a connecting radial portion 784, a conical portion 786 (e.g., an inner radial portion), and/or a cavity 790. In some instances, the isolator/bumper 628 may be configured to reduce and/or prevent radial movement (e.g., X-direction) of the first member 622 relative to the second member 624 and/or the second member 624 relative to the first member 622. The isolator/bumper 628 may be configured to function as a bumper and/or a stop between the first member 622 and the second member 624.

With embodiments, the outer radial portion 782 may extend from the connecting radial portion 784 in the axial direction. The conical portion 786 may extend from the connecting portion 784 in the axial direction. The conical portion 786 may extend from the connecting portion 784 in a similar direction as the outer radial portion 782. The conical portion 786 may include an aperture 792 that may be in fluid communication with the cavity 790.

In embodiments, the isolator/bumper 628 may be comprised of an elastic material such as a rubber material and/or a thermoplastic elastomer (TPE), among others. In some instances, the isolator/bumper 628 may be comprised of micro cellular polyurethane (MCU).

With embodiments, such as generally illustrated in FIG. 19, in an assembled configuration, the isolator/bumper 628 may be connected (e.g., vulcanized, bonded, etc.) to the first member 622. In some example configurations, the isolator/bumper 628 may be integrally formed (e.g., via 2K injection molding, etc.) with the first member 622. The isolator/bumper 628 may be connected to the first member 622 such that at least a portion of the first axial extension 692 of the second member 624 is disposed within the cavity 790 of the isolator/bumper 628. The outer radial portion 782 of the isolator/bumper 628 may be disposed radially outward of the first axial extension 692 of the second member 624. The isolator/bumper 628 may be disposed such that during operation of the air spring 620, the conical portion 786 may engage the support surface 698 of the second member 624.

Figure 21:
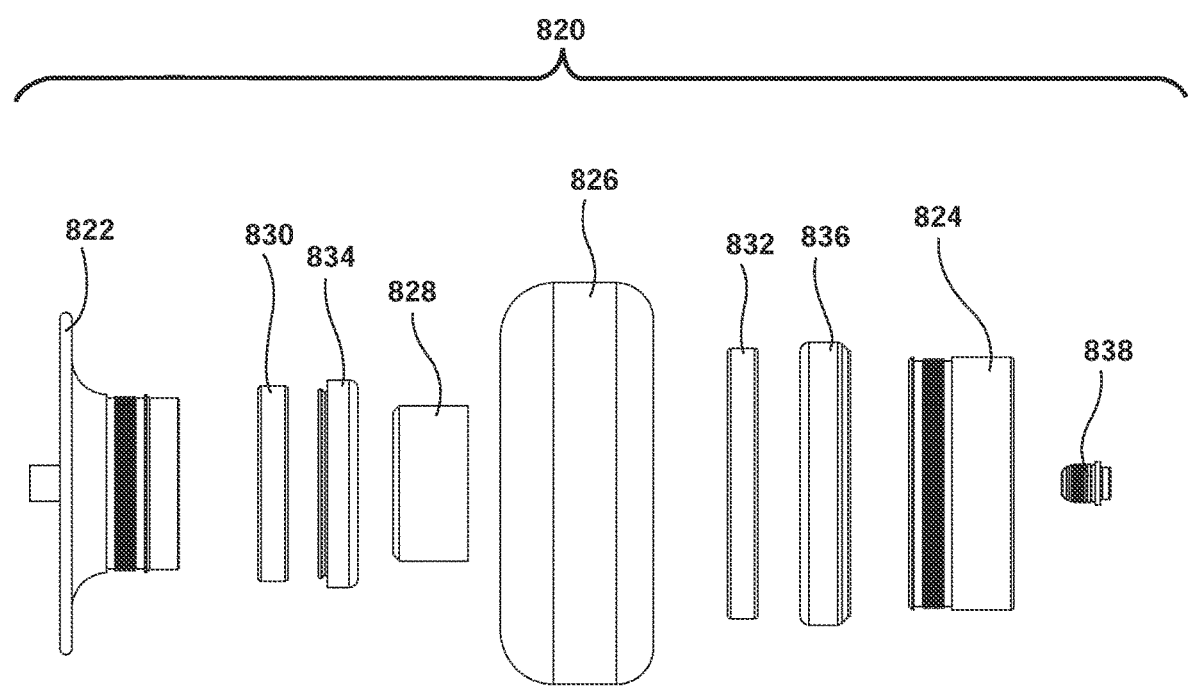
FIG. 21 is an exploded side view generally illustrating portions of an embodiment of an air spring according to teachings of the present disclosure.
Figure 22:
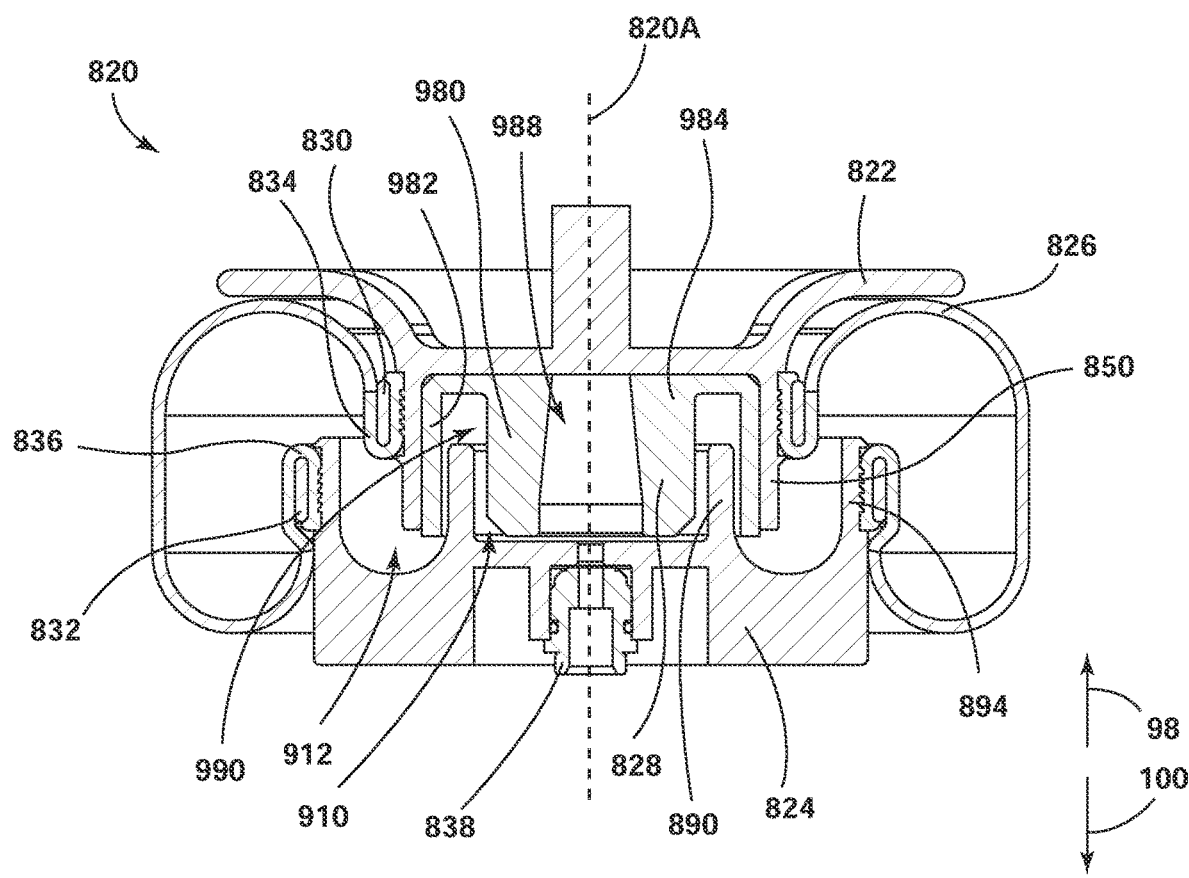
FIG. 22 is a cross-sectional view generally illustrating portions of an embodiment of an air spring according to teachings of the present disclosure.
Figure 22:
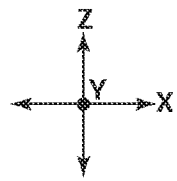

In embodiments, such as generally illustrated in FIGS. 21 and 22, an air spring 820 may include a first member 822, a second member 824, a flexible bellows 826, an isolator/bumper 828, a first clamp 830, a second clamp 832, a first seal 834, a second seal 836, and/or a fluid connector 838. The first member 822 may be configured to facilitate connection of the air spring 820 with a first external component or structure 40 of vehicle 42 (e.g., a vehicle body, a vehicle frame, and/or a vehicle component, among others) and the second member 824 may be configured to facilitate connection of the air spring 820 with a second external component or structure 44 of the vehicle 42 (e.g., a vehicle body, a vehicle frame, and/or a vehicle component, among others). The air spring 820 may be configured to restrict, dampen, and/or absorb relative movement between the first external component 40 and the second external component 44. The air spring 820 may include an axis 820A (e.g., a central axis) that may extend in the Z-direction (see, e.g., FIG. 22).

With embodiments, the first member 822 may be configured in the same or a similar manner as the first member 22 of the air spring 20. The second member 824 may be configured in the same or similar manner as the second member 24 of the air spring 20. The flexible bellows 826 may be configured in the same or a similar manner as the flexible bellows 26 of the air spring 20. The first clamp 830 may be configured in the same or a similar manner as the first clamp 30 of the air spring 20. The second clamp 832 may be configured in the same or a similar manner as the second clamp 32 of the air spring 20. The first seal 834 may be configured in the same or a similar manner as the first seal 34 of the air spring 20. The second seal 836 may be configured in the same or a similar manner as the second seal 36 of the air spring 20. The first seal 834 and/or the second seal 836 may be formed integrally with the bellows 826. The fluid connector 838 may be configured in the same or a similar manner as the fluid connector 38 of the air spring 20.

Figure 23:
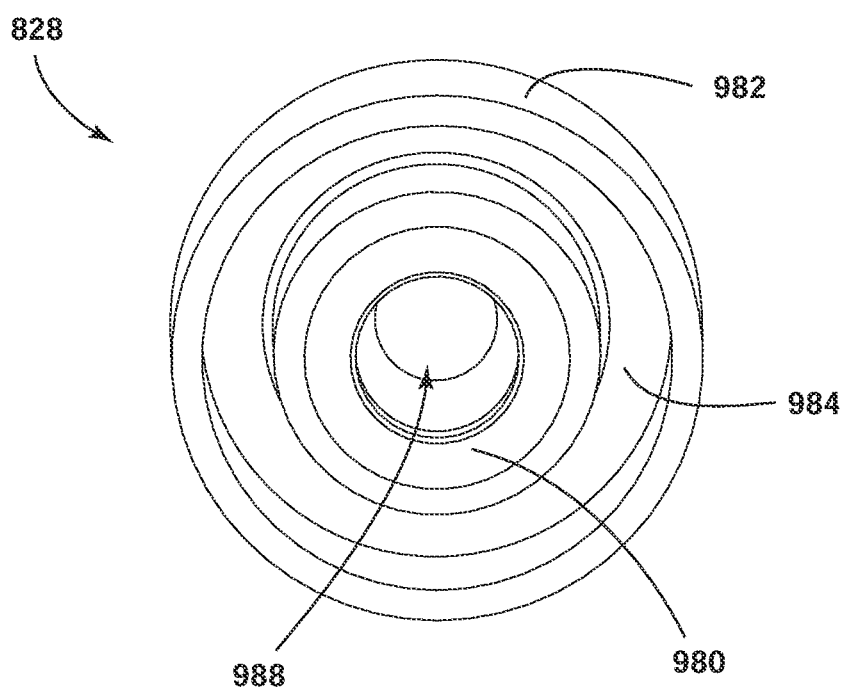
FIG. 23 is a perspective view generally illustrating embodiments of an isolator/bumper according to teachings of the present disclosure.

In embodiments, an isolator/bumper 828 may comprise one or more of a variety of shapes, sizes, configurations, and/or materials. With embodiments, such as generally illustrated in FIGS. 22 and 23, the isolator/bumper 828 may include an inner radial portion 980, an outer radial portion 982, a connecting radial portion 984, an inner passage 988, and/or a cavity 990. In some instances, the isolator/bumper 828 may be configured to reduce and/or prevent radial movement (e.g., X-direction) of the first member 822 relative to the second member 824 and/or the second member 824 relative to the first member 822. The isolator/bumper 828 may be configured to function as a bumper and/or a stop between the first member 822 and the second member 824.

With embodiments, the inner radial portion 980 may be connected to the outer radial portion 982 via the connecting radial portion 984. The inner radial portion 980 may be disposed radially inward of the outer radial portion 982. The inner passage 988 may be disposed within the inner radial portion 980.

In embodiments, in some example configurations, the inner radial portion 980 and the outer radial portion 982 may be integrally formed. The isolator/bumper 828 may be comprised of a rubber material, among others. In some instances, the isolator/bumper 828 may be comprised of micro cellular polyurethane (MCU).

With embodiments, such as generally illustrated in FIG. 22, in an assembled configuration, the isolator/bumper 828 may be connected to first member 822. In some example configurations, the isolator/bumper 828 may be integrally formed (e.g., via 2K injection molding, etc.) with the first member 822. The isolator/bumper 828 may be connected (e.g., vulcanized, bonded, etc.) to first member 822 such that the first axial extension 890 of the second member 824 is disposed within the cavity 990 of the isolator/bumper 828. The inner radial portion 980 of the isolator/bumper 828 may be disposed radially inward of the axial extension 850 of the first member 822. The outer radial portion 982 of the isolator/bumper 828 may be disposed radially outward of the first axial extension 890 of the second member 824. The outer radial portion 982 of the isolator/bumper 828 may be radially disposed between the first axial extension 890 of the second member 824 and the axial extension 850 of the first member 822. In example configurations, a gap may be disposed between the connecting radial portion 984 of the isolator/bumper 828 and the first axial extension 890 of the second member 824. The gap may define the axial travel of the isolator/bumper 828 relative to the second member 824. In some instances, when the gap is closed (e.g., first axial extension 890 is in contact with connecting radial portion 984) the first axial extension 890 may prevent the isolator/bumper 828 from moving further in the direction 100 such that the inner radial portion 980 of the isolator/bumper 828 is prevented from being damaged. In embodiments, the first axial extension 890 may, among other things, help prevent a central bumper from being compressed/squeezed and damaged or destroyed, thus serving in a capacity as an overload protection component.

Figure 24:
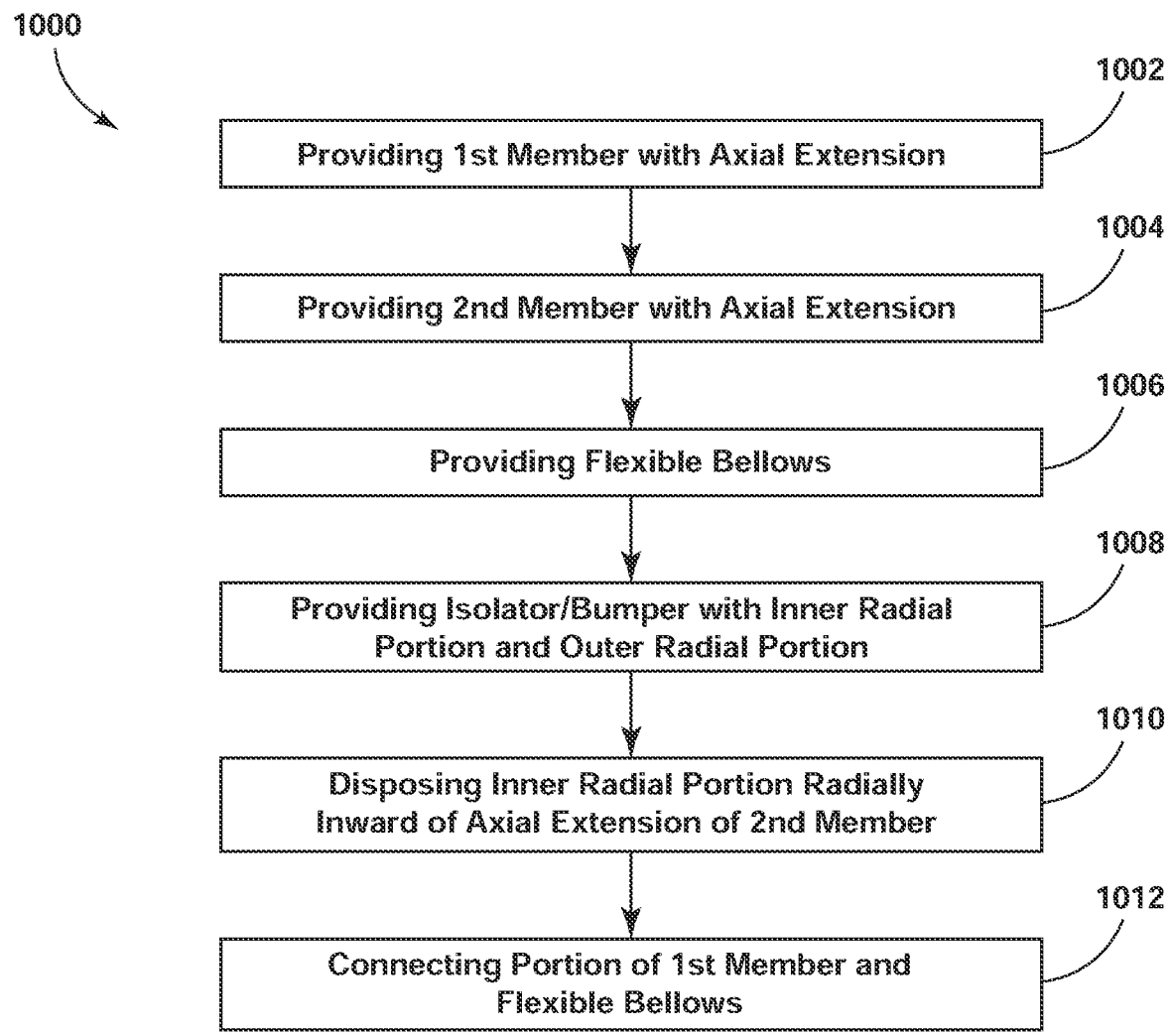
FIG. 24 is a flowchart generally illustrating an embodiment of a method of making an air spring.

With some embodiments, such as generally illustrated in FIG. 24, a method 1000 of making an air spring (e.g., air spring 20) may include providing a first member (e.g., first member 22) with a first member axial extension (e.g., axial extension 50) (block 1002); providing a second member (e.g., second member 24) with a second member axial extension (e.g., axial extension 92) (block 1004); providing a flexible bellows (e.g., bellows 26) (block 1006); providing an isolator/bumper (e.g., isolator/bumper 28) including an inner radial portion (e.g., inner radial portion 180) and an outer radial portion (e.g., outer radial portion 182) (block 1008); disposing the inner radial portion radially inward of the second member axial extension, wherein a portion of the outer radial portion is disposed between the first member axial extension and the second member axial extension (block 1010); connecting a portion of the second member and the flexible bellows (block 1212); and/or connecting a portion of the first member and the flexible bellows (block 1214). In some embodiments, an isolator/bumper 28 may be vulcanized or bonded to upper and lower components. In such a case, no further assembly may be necessary with the connection of the isolator/bumper.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples," "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. An air spring comprising:
    a first member including a first member axial extension that extends in an axial direction;
    a second member including a second member axial extension that extends in the axial direction;
    a flexible bellows connected to the first member and connected to the second member, the flexible bellows defines a pressurized fluid volume; and
    an isolator/bumper including an inner radial portion and an outer radial portion;
    wherein the inner radial portion is disposed radially inward of the first member axial extension or the second member axial extension, the outer radial portion is disposed radially outward of the first member axial extension or the second member axial extension, and the inner radial portion is connected to the outer radial portion by a connecting radial portion.

2. The air spring of claim 1, wherein the inner radial portion and the outer radial portion are integrally formed.

3. The air spring of claim 1, wherein the isolator/bumper is comprised of rubber.

4. The air spring of claim 1, wherein the isolator/bumper is comprised of micro cellular polyurethane (MCU).

5. The air spring of claim 1, wherein the outer radial portion and/or a surface of the outer radial portion is comprised of a low friction material containing polytetrafluoroethylene (PTFE).

6. The air spring of claim 1, wherein the outer radial portion of the isolator/bumper is radially disposed between the second member axial extension and the first member axial extension.

7. The air spring of claim 1, wherein an inner fluid passage of the isolator/bumper includes at least one aperture configured for release of fluid from the inner fluid passage.

8. The air spring of claim 1, wherein the first member and/or the second member are comprised of die casted aluminum, injection molded polymer, or a hybrid material of both.

9. The air spring of claim 1, wherein the flexible bellows is comprised of reinforced rubber.

10. The air spring of claim 1, wherein the flexible bellows contains two rolling folds.

11. The air spring of claim 1, including a bumper gap and a bellows gap, wherein the bellows gap is greater than the bumper gap.

12. The air spring of claim 1, wherein at least a portion of an outer radial surface of the outer radial portion is textured.

13. The air spring of claim 1, wherein at least a portion of an outer radial surface of the outer radial portion is comprised of low-friction rubber.

14. The air spring of claim 1, wherein a vertical length of the outer radial portion of the isolator/bumper is greater than a vertical length of the first member axial extension or the second member axial extension.

15. The air spring of claim 1, wherein the first member includes a curved portion adjacent to the flexible bellows.

16. A method of making an air spring as in claim 1, the method comprising:
  disposing the inner radial portion radially inward of the second member axial extension, wherein a portion of the outer radial portion is disposed between the first member axial extension and the second member axial extension;
  connecting a portion of the second member and the flexible bellows; and
  connecting a portion of the first member and the flexible bellows.

17. An air spring comprising:
  a first member including a first member axial extension that extends in an axial direction;
  a second member including a second member axial extension that extends in the axial direction;
  a flexible bellows connected to the first member and connected to the second member, the flexible bellows defines a pressurized fluid volume; and
  an isolator/bumper including an inner radial portion and an outer radial portion;
  wherein the inner radial portion is disposed radially inward of the first member axial extension or the second member axial extension, and the outer radial portion is disposed radially outward of the first member axial extension or the second member axial extension,
  wherein an outer radial extension of the first member extends outwardly radial beyond an upper apex/tangent point of the flexible bellows.

18. The air spring of claim 17, wherein the upper apex/tangent point of an upper rolling fold is in direct contact to the outer radial extension of the first member in a k0-position of a vehicle.

19. An air spring comprising:
  a first member including a first member axial extension that extends in an axial direction;
  a second member including a second member axial extension that extends in the axial direction;
  a flexible bellows connected to the first member and connected to the second member, the flexible bellows defines a pressurized fluid volume;
  a bumper including an inner radial portion; and
  a control element including an outer radial portion, the control element is formed separately from the bumper;
  wherein the inner radial portion is disposed radially inward of the first member axial extension or the second member axial extension, the outer radial portion is disposed radially outward of the first member axial extension or the second member axial extension, and the inner radial portion is connected to the outer radial portion by a connecting radial portion.

* * * * *